(12) United States Patent
El Kolli et al.

(10) Patent No.: US 11,252,319 B2
(45) Date of Patent: Feb. 15, 2022

(54) POWER MANAGEMENT IN A POWER OVER DATA NETWORK

(71) Applicant: CANON KABUSHIKI KAISHA, Tokyo (JP)

(72) Inventors: Yacine El Kolli, Rennes (FR); Hervé Merlet, Servon sur Vilaine (FR)

(73) Assignee: Canon Kabushiki Kaisha, Tokyo (JP)

( * ) Notice: Subject to any disclaimer, the term of this patent is extended or adjusted under 35 U.S.C. 154(b) by 836 days.

(21) Appl. No.: 16/063,200

(22) PCT Filed: Dec. 19, 2016

(86) PCT No.: PCT/EP2016/081749
§ 371 (c)(1),
(2) Date: Jun. 15, 2018

(87) PCT Pub. No.: WO2017/108693
PCT Pub. Date: Jun. 29, 2017

(65) Prior Publication Data
US 2020/0275025 A1 Aug. 27, 2020

(30) Foreign Application Priority Data
Dec. 21, 2015 (GB) .................................... 1522546

(51) Int. Cl.
*H04N 5/232* (2006.01)
*G06F 1/26* (2006.01)
*G08B 13/196* (2006.01)

(52) U.S. Cl.
CPC .......... *H04N 5/23206* (2013.01); *G06F 1/26* (2013.01); *G08B 13/19656* (2013.01); *H04N 5/23241* (2013.01)

(58) Field of Classification Search
CPC .................. G06F 1/26; G08B 13/19656; H04N 5/23241; H04N 5/23206
See application file for complete search history.

(56) References Cited

U.S. PATENT DOCUMENTS

| | | | |
|---|---|---|---|
| 2004/0163001 A1 | 8/2004 | Bodas | |
| 2010/0141762 A1* | 6/2010 | Siann | H04N 5/232411 348/143 |
| 2010/0292861 A1* | 11/2010 | Tsai | G06F 1/266 700/296 |
| 2013/0257447 A1* | 10/2013 | Kitaura | G01R 19/16571 324/537 |
| 2014/0028817 A1* | 1/2014 | Brockway, III | H04N 5/232411 348/61 |
| 2014/0267746 A1* | 9/2014 | Hertrich | G08B 13/19656 348/159 |
| 2020/0250944 A1* | 8/2020 | Griffis | H04N 5/23238 |

* cited by examiner

*Primary Examiner* — Ronald D Hartman, Jr.
(74) *Attorney, Agent, or Firm* — Canon U.S.A., Inc. IP Division

(57) ABSTRACT

A method of managing power in a power over data network, the method includes, obtaining a first request for modification of a power consumption profile of a device connected to the network, when the modification entails a raise in the power consumption profile, determining whether the first request can be satisfied with regards to a current consumption situation over the network, and when it is determined that the first request cannot be satisfied, triggering a broadcast over the network of a second request for lowering a power consumption profile of at least one device connected to the network, and getting back to said determination step.

24 Claims, 22 Drawing Sheets

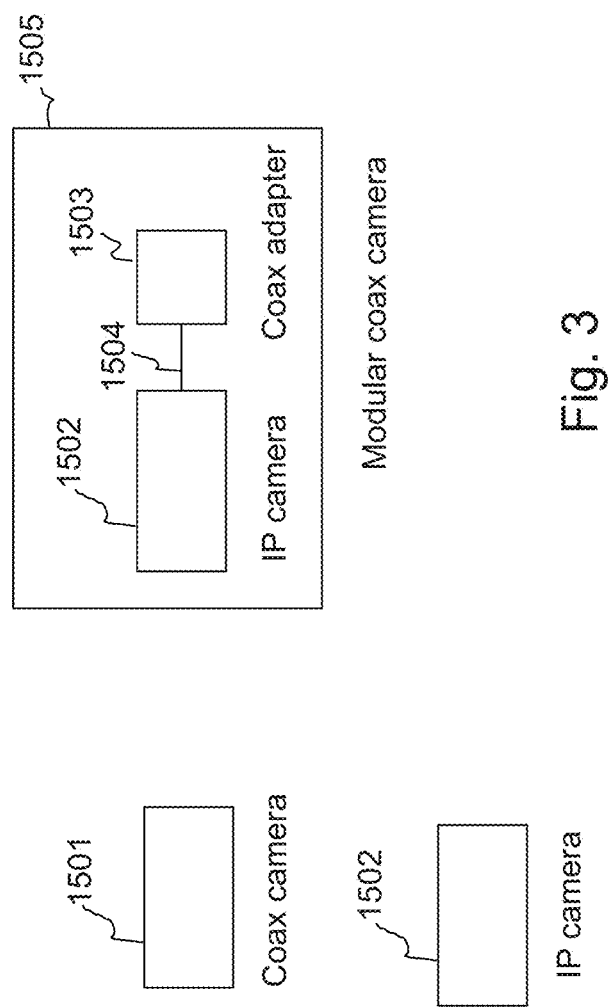

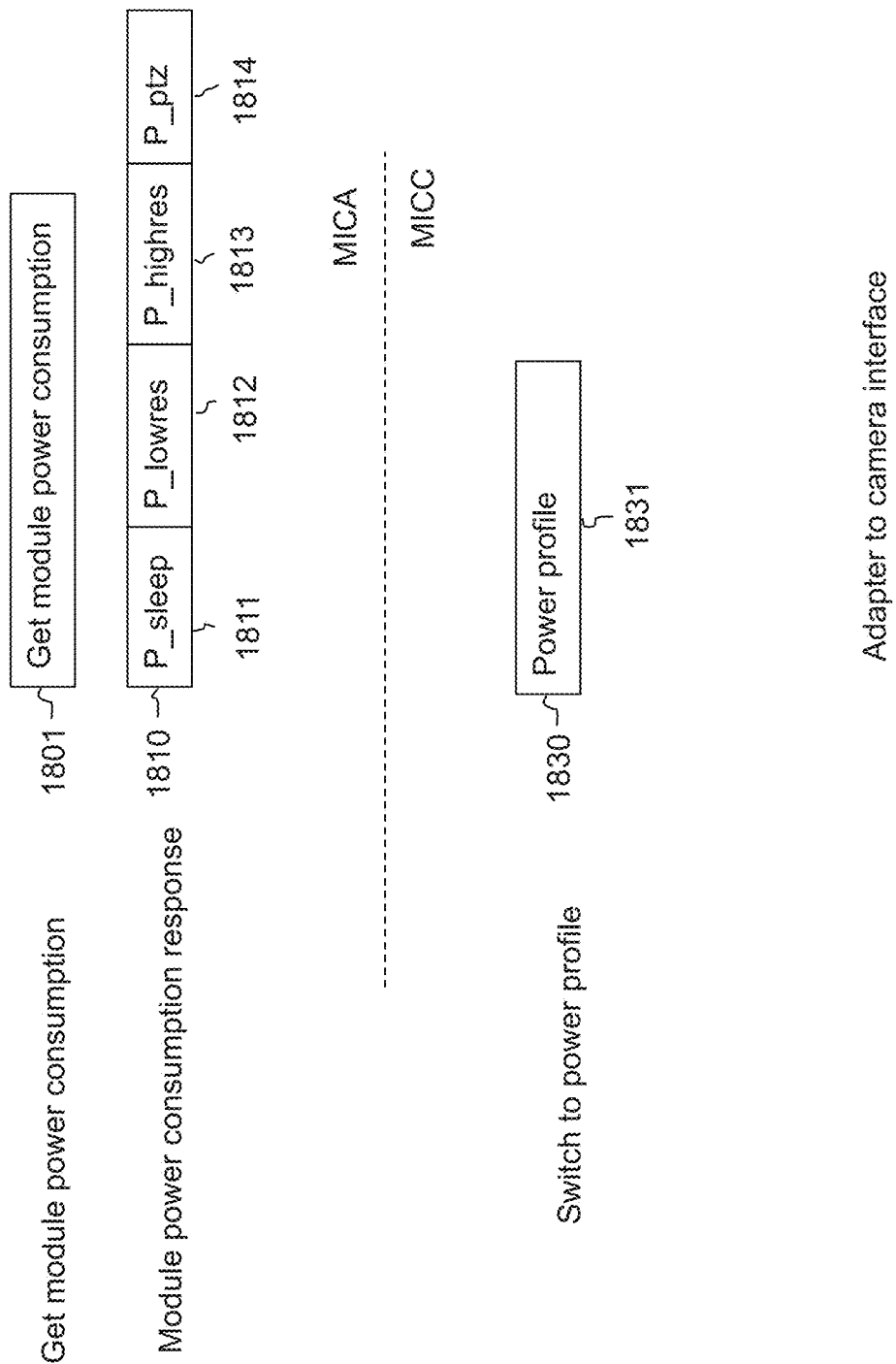

POWER MANAGEMENT IN A POWER OVER DATA NETWORK

CROSS-REFERENCE TO RELATED APPLICATIONS

The present application is a National Phase application of International Patent Application No. PCT/EP2016/081749, filed Dec. 19, 2016, entitled "Power management in a power over data network", which claims priority to United Kingdom Patent Application No. 1522546.9, filed on Dec. 21, 2015, all of which are hereby expressly incorporated by reference herein in their entirety.

FIELD OF THE INVENTION

The present invention relates to power over data network, in particular digital video surveillance systems.

More particularly, the present invention relates to video systems using power over data cables (such as Power over Ethernet "PoE" and Power over Coax "PoC") to distribute the power from a central point to the surveillance cameras.

BACKGROUND OF THE INVENTION

Power distribution over data cables is a very interesting technique since it saves the costs of a dedicated power network in parallel of the data network or expensive battery solutions.

However, the total power that can be carried using power distribution over data cables is limited and the power loss in the cable is high because of the relatively low voltage that is carried (typically 48 to 56 volts). On the contrary, power distribution networks carry 110 to 220 volts and therefore they are less prone to power loss. However, they require AC/DC converters to power the devices.

The systems relying on power distribution over data cables are called power constrained systems.

The power is constrained at two levels.

The first level is the port level. A switch or other network equipment makes it possible to deliver only a maximum amount of power on a single port. This usually limits the type of device that can be powered.

The second level is the switch or network equipment level. The sum of per port available power shall be sustained by the device's own power supply.

Video surveillance camera manufacturers provide documents with the maximum and typical power consumption of their devices. Such information is used by system integrators for power supply dimensioning. Often, the maximum power consumption specification is a conservative FIG. and is higher than what is actually consumed by the camera.

Cameras power consumption can be sorted into three power consumption levels:
- the lowest power consumption level is when the camera is in the lowest resolution mode,
- the typical power consumption level is when the camera is in high resolution mode,
- the maximum power consumption level is when the camera motors are in action (for PTZ ("Pan-Tilt-Zoom"), optical zoom, . . . ) or when an internal electrical heater is used.

Based on this categorization, a power constrained video surveillance system performance can be characterized by a combination of three criteria:
1. The coverage: the more cameras are used, higher is the area covered by the video surveillance system.
2. The resolution: the image resolution of each camera defines the system global resolution.
3. The adaptability: PTZ cameras and mechanical optical zoom increases the system adaptability to changing conditions or allow to compensate for a lower coverage rate.

In a power constrained video system, it may not be possible to raise each of the three criteria simultaneously to the maximum.

In document "*SensEye: A Multi-tier Camera Sensor Network*", of Purushottam Kulkarni, Deepak Ganesan, Prashant Shenoy and Qifeng Lu, Department of Computer Science, University of Massachusetts, Amherst, Mass. 01003, there is described a hierarchical system wherein low resolution cameras can wakeup sleeping high resolution cameras that it turn can wakeup sleeping PTZ cameras. The wakeup event is based on motion detection.

This system is particularly well adapted for systems based on battery powered cameras. Each high battery consumption camera (high resolution and PTZ) is sleeping unless waken up by a low resolution camera when needed. Thus, the lifetime of the batteries is extended.

However, this system does not match the requirements of power constrained systems since it not designed to keep the power consumption within a given power budget. All cameras can be set to work simultaneously since they are battery powered and thus not subject to power shortage from a shared power supply source.

Ethernet PoE switches are usually based on priority levels. The switch may not be able to supply power to all connected devices if the total power needed exceeds a certain threshold. Priority levels are used for determining which ports are allowed to supply power. When ports have a same priority, the port which has the lowest number is given higher priority.

This solution is static and is not useful for discriminating the power profile of each camera.

Thus, the inventors brought into light the fact that there is still a need for improved power network systems. In particular, there is still a need for power management techniques that make it possible to dynamically extend coverage and/or resolution and/or achieve adaptability in power constrained video monitoring systems.

The present invention lies within this context.

SUMMARY OF THE INVENTION

According to a first aspect of the invention there is provided a method of managing power in a power over data network, the method comprising the following steps:
- obtaining a first request for modification of a power consumption profile of a device connected to said network,
- when said modification entails a raise in said power consumption profile, determining whether said first request can be satisfied with regards to a current consumption situation over the network, and
- wherein, when it is determined that said first request cannot be satisfied:
- triggering a broadcast over the network of a second request for lowering a power consumption profile of at least one device connected to said network, and
- getting back to said determination step.

Embodiments make it possible to manage power distribution in power over data networks in an efficient manner.

By virtue of these features, before of modifying the power consumption profile of a device, the global power budget situation of the network is checked. Thus, the global power budget of the network is never exceeded.

According to a feature, said modification entails a drop in said power consumption, the method comprises triggering:
said modification of said power consumption profile, and
a broadcast of a message over the network identifying said modification of said power consumption profile.

Thus, the global power budget of the network being not exceeded by this modification of power consumption profile, the device modifies its power consumption profile.

In addition, all devices in the network are informed of the change of power consumption profile of a device.

According to a feature, said triggering of said modification of said power consumption profile comprises sending a request for modification of said power consumption profile to said device connected to said network.

Thus, the power budget is managed in a centralized manner allowing complex management algorithms to be used.

According to a feature, said first request is received through a user interface of a device of the network.

According to a feature, first request is triggered by a power profile selection by a user in said interface.

Thus, an operator may change the power consumption profile of the devices of the network.

According to a feature, when it is determined that said first request can be satisfied, the method further comprises triggering:
said modification of said power consumption profile, and
a broadcast of a message over the network identifying said modification of said power consumption profile.

Thus all devices in the network have real-time information about power budget changes in the network.

According to a feature, said second request is sent to all devices connected to the network, said second request triggering a minimization of power consumption profile of each device receiving the request.

According to a feature, said second request is sent successively to candidate devices after successive determinations of whether said first request can be satisfied with regards to a current consumption situation over the network.

The device thus releases only the needed amount of power.

According to a feature, said second request triggers a minimization of power consumption profile of each device receiving the second request.

Thus, the response to the request for lowering the power consumption profile is faster.

According to a feature, said second request triggers an incremental lowering of power consumption profile of each device receiving the second request.

Thus, the power is lowered equally among all devices in the network receiving the request for lowering the power consumption profile.

According to a feature, the method further comprising emitting a message indicating that said first request cannot be satisfied.

Thus, troubleshoot of the system is easy.

According to a feature, said triggering of a broadcast over the network of a second request for lowering a power consumption profile comprises emitting a message indicating that said first request cannot be satisfied.

Thus, the power status of the system may be monitored.

According to an embodiment, said network comprises a plurality of devices controlled by a control device, and wherein said method is carried out by each of the devices.

Thus the method being carried out by each of the devices of the network, the processing is distributed among the devices of the system.

According to another embodiment, said network comprises a plurality of devices controlled by a control device, and wherein said method is carried out by said control device.

Thus, the complexity of the devices is low.

According to a feature, said network comprises a plurality of devices controlled by a control device, and wherein said message indicating that said first request cannot be satisfied is sent by a device to the control device, said broadcast over the network of a second request for lowering a power consumption profile is sent by said device and the other steps are carried out by said devices.

Thus, the processing is distributed among the devices of the system.

According to a feature, said network is a video surveillance network, said devices are cameras and said control device a video monitoring system.

According to a feature, the method further comprises the following steps, when a device is newly connected to the network:
broadcasting a message comprising power profile characteristics of the device newly connected to the network,
receiving, in response to said message, at least one power profile information message from at least one device connected to the network, said at least one power profile information message comprising power profile information concerning said at least one device connected to the network, and
determining a current consumption situation over the network based on said received at least one power profile information message from at least one device connected to the network.

Thus, troubleshoot at a new device start-up is easy and an under-dimensioned power supply for the system may be detected.

According to a feature, the method further comprises:
determining whether it is possible to lower the power profile of the device newly connected to the network with regards to the determined current consumption situation over the network, and
if the power profile cannot be lowered, emitting an alert message indicating that at least one power consumption will not be satisfied on the network.

Thus, when a power profile of the device newly connected to the network cannot be lowered, troubleshoot of the system is easy, even when a device is connected without starting-up the whole system, that is when the device is «hot plugged».

According to a feature, the method of managing power in a power over data network is performed by a monitoring device of the network, the method comprising the following steps
determining that a first request for modification of the power consumption profile of a device connected to the network cannot be satisfied, when said modification entails a raise in said power consumption profile, and
repeatedly broadcasting over the network a second request for lowering the power consumption profiles of the other devices connected to the network, said second request being repeatedly broadcasted until said first request can be satisfied.

Thus, the complexity of the devices connected to the network is low.

According to a feature, said determining step comprises receiving, from said device connected to the network, a message indicating said first request for modification of its power consumption profile cannot be satisfied.

Thus, an operator may monitor the power status of the device.

According to a feature, said determining step comprises:
determining a current consumption situation over the network, and
determining whether the modification of the power profile according to the request is possible with regards to the determined current consumption situation over the network.

According to a feature, the method further comprises transmitting to the device connected to the network, a message indicating that the first request can be satisfied.

Thus, the power budget situation in the network may be monitored in real-time.

According to a feature, the method of managing power in a power over data network is performed by a device connected to the network, the method comprising the following steps:
obtaining a first request for modification of a power consumption profile of the device connected to said network,
when said modification entails a raise in said power consumption profile, determining whether said first request can be satisfied with regards to a current consumption situation over the network, and
wherein, when it is determined that said first request cannot be satisfied:
triggering a broadcast over the network of a second request for lowering a power consumption profile of at least one device connected to said network.

According to a feature, said broadcasting is performed by said device connected to the network and the method further comprises getting back to said determination step after the broadcasting.

According to a feature, said triggering step comprises:
transmitting to a monitoring device of the network a message indicating that said first request cannot be satisfied with regards to the current consumption situation over the network, thereby enabling the monitoring device to perform the broadcasting, and
receiving, in response to said message, a message indicating that the first request can be satisfied.

Thus the power budget situation in the network is managed in a centralized manner allowing complex management algorithms to be used.

According to a feature, said device connected to the network comprises a camera device.

According to a feature, said device connected to the network further comprises a network adapter connected to the camera device by a communication link.

Thus, since an adapter can be connected to various types of cameras, different types of cameras and of adapters may be used in the system, the system being flexible.

According to a feature, the method comprises, said device connected to the network receive a request for modification of power consumption profile, and said network adapter sending a message (for example a "switch to power profile" message) to the said camera device containing a new power profile.

According to a feature, the method further comprising:
the camera device sending a first message (for example a "get module power consumption" message) to said network adapter, and the network adapter sending in response to said first message (for example a "get module power consumption" message), a second message (for example a "module power consumption response" message) comprising the power consumption of the network adapter.

Thus the power budget situation in the network can be calculated with greater accuracy by taking into account the adapter power overhead.

According to a second aspect of the invention there is provided a device of managing power in a power over data network, the device comprising:
means for obtaining a first request for modification of a power consumption profile of said device, said device being connected to said network,
means for determining whether said first request can be satisfied with regards to a current consumption situation over the network, when said modification entails a raise in said power consumption profile, and
means for triggering a broadcast over the network of a second request for lowering a power consumption profile of at least one device connected to said network when means for determining determine that said first request cannot be satisfied.

According to a feature, the device further comprises means for triggering:
said modification of said power consumption profile, and
a broadcast of a message over the network identifying said modification of said power consumption profile, when said modification entails a drop in said power consumption.

According to a feature, said means for triggering said modification of said power consumption profile comprises means for sending a request for modification of said power consumption profile to one device connected to said network.

According to a feature, the device further comprises means for triggering:
said modification of said power consumption profile, and
a broadcast of a message over the network identifying said modification of said power consumption profile, when it is determined that said request can be satisfied.

According to a feature, the device further comprising means for emitting a message indicating that said first request cannot be satisfied.

According to a feature, said means for triggering of a broadcast over the network of a second request for lowering a power consumption profile comprises means for emitting said message indicating that said first request cannot be satisfied.

According to a feature, said is controlled by a control device, said device being configured for carrying out a method according to the invention.

According to a feature, said device is a control device controlling a plurality of devices connected to said network, said control device being configured for carrying out a method according to the invention.

According to a feature, the device further comprising:
means for broadcasting a message comprising power profile characteristics of a device newly connected to the network,
means for receiving, in response to said message, at least one power profile information message from at least one device connected to the network, said at least one power profile information message comprising power profile information concerning said at least one device connected to the network, and means for determining a current consumption situation over the network based on said received at least one power profile information message from at least one device connected to the network.

According to a feature, the device further comprising:

means for determining whether it is possible to lower the power profile of the device newly connected to the network with regards to the determined current consumption situation over the network, and means for emitting an alert message indicating that at least one power consumption will not be satisfied on the network, if the profile cannot be lowered.

According to a feature, the device comprises:

means for determining that a first request for modification of the power consumption profile of a device connected to the network cannot be satisfied, when said modification entails a raise in said power consumption profile, and means for repeatedly broadcasting over the network a second request for lowering the power consumption profiles of the other devices connected to the network, said second request being repeatedly broadcasted until said first request can be satisfied.

According to a feature, said means for determining comprises:

means for determining a current consumption situation over the network, and means for determining whether the modification of the power profile according to the request is possible with regards to the determined current consumption situation over the network.

According to a third aspect of the invention there is provided a camera device performing the method for managing power according to the invention; said camera device being connected to a network.

According to a feature, the camera device connected further comprises a network adapter connected to said camera device by a communication link.

According to a feature, the camera device comprises:

means for sending a first message (for example a "get module power consumption" message) to said network adapter, and means for receiving in response to said first message (for example a "get module power consumption" message), a second message (for example a "module power consumption response" message) comprising the power consumption of the network adapter.

According to a fourth aspect of the invention there is provided a network adaptor connected to a camera device by a communication link, the network adaptor comprising means for sending a message (for example a "switch to power profile" message) to said camera device containing a new power profile when said camera device receive a request for modification of power consumption profile.

According to a fifth aspect of the invention there is provided a system comprising a plurality of camera devices and a control camera device, the camera devices and the control camera device being according to the invention, said network being a video surveillance network, and said control camera device a video monitoring system.

According to a sixth aspect of the invention there is provided a means for storing information which can be read by a computer or a microprocessor holding instructions of a computer program, for implementing a method for wireless communications according to the invention, when said information is read by said computer or said microprocessor.

The means for storing information may be partially or totally removable.

According to a seventh aspect of the invention there is provided a computer program product which can be loaded into a programmable apparatus, comprising a sequence of instructions for implementing a method for managing power according to the invention, when said computer program product is loaded into and executed by said programmable apparatus.

The objects according to the second, third, fourth, fifth, sixth and seventh aspects of the invention provide at least the same advantages as those provided by the method according to the first aspect.

BRIEF DESCRIPTION OF THE DRAWINGS

Features and advantages of the invention will become apparent from the following description of non-limiting exemplary embodiments, with reference to the appended drawings, in which.

DETAILED DESCRIPTION OF THE INVENTION

In what follows, embodiments of the invention are described in the context of a video surveillance system.

It is made possible for an operator to change the power profile of a camera from a video monitoring system (VMS). The operator may change the power consumption profile of the devices of the network, in particular, the operator may:

1. Change coverage: request to turn on/off a camera (SLEEP profile),
2. Change resolution: request to increase/decrease the resolution of a camera (Low_res and High_res profile),
3. Change angle: request a PTZ move of a camera or a change of the optical zoom setting (PTZ profile).

According to first embodiments, the power budget calculation and the power negotiation are carried out by the cameras. Each camera that receives a command (or request) for changing its power profile that will result in a raise of its own power consumption:

Checks the total power budget situation in the network,
If the power budget allows it, changes its power profile, publish its new power status,
If the power budget does not allow it, repeatedly requests other cameras to lower their power profile until success.

Each camera that receives a user command that will result in a drop of its own power consumption profile publishes its new power profile to all cameras.

According to second embodiments, the cameras perform the power budget calculation and the VMS performs the power negotiation. Each camera that receives a command for changing its power profile that will result in a raise of its own power consumption:

Checks the total power budget situation,
If the power budget allows it, change its power profile, publishes its new power status,
If the power budget does not allow it, sends a negative acknowledgement to the VMS.

Each camera that receives a user command that will result in a drop of its own power consumption profile publishes its new power profile to all cameras On the VMS side if a negative acknowledgement is received, then the VMS repeatedly asks other cameras to lower their power profile until enough power has been cleared to send again a power profile change command to the camera.

According to third embodiments, the power budget calculation and negotiation are carried out by the VMS. The camera power budget is increased to allow a power profile change for a given camera and then if the increased camera power budget does not fit into the system power budget then the VMS repeatedly asks the other cameras to lower their power profile until enough power has been cleared to send the power profile change command to the originally targeted camera.

First, embodiments wherein both the power budget calculation and the power negotiation are carried out at a camera level are described.

Figure 1A:
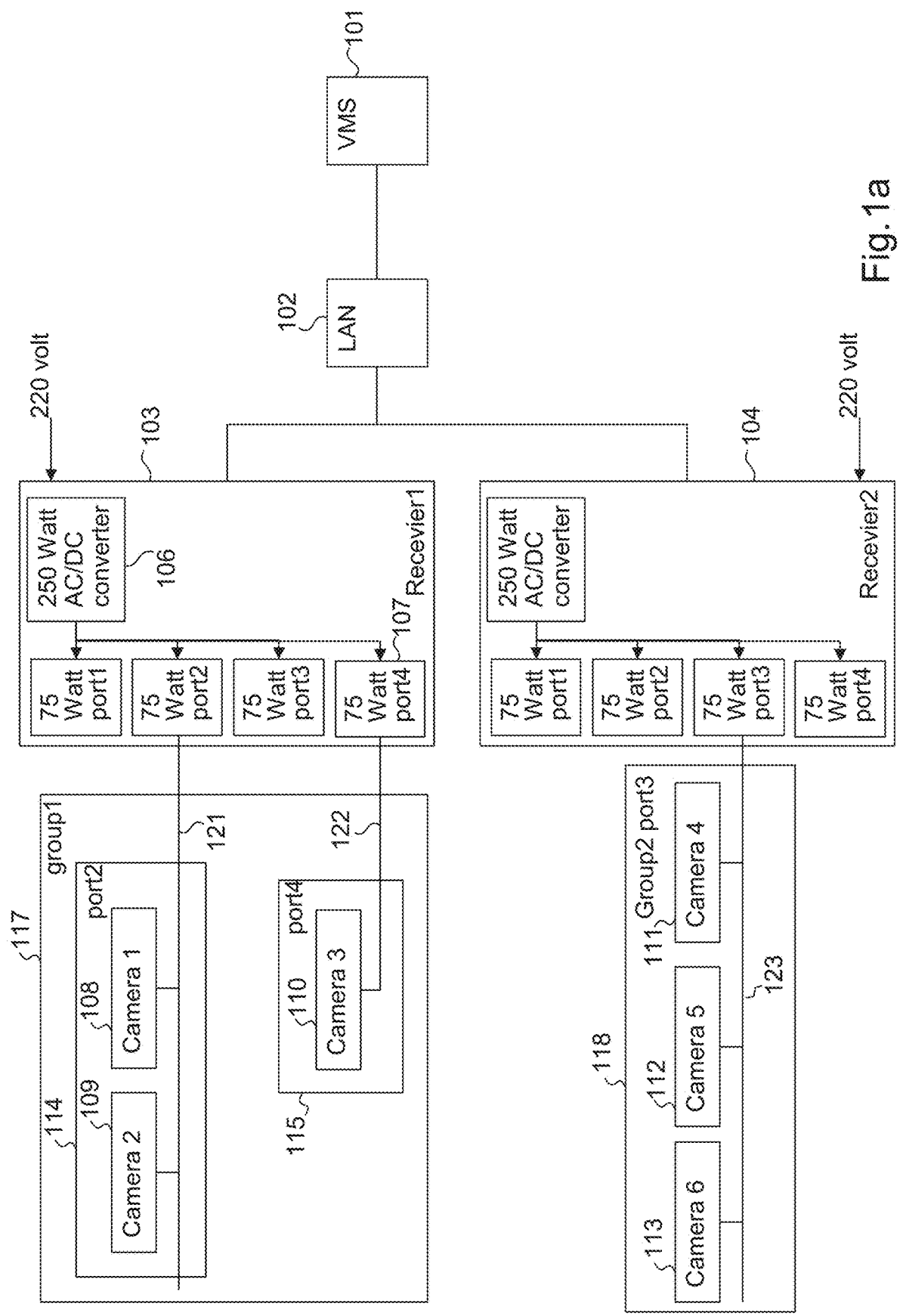
FIG. 1a schematically illustrates a video surveillance system implementing IP over Coax, FIG. 1b schematically illustrates an Ethernet video surveillance system.

FIG. 1a schematically illustrates an IP over Coax video surveillance system.

At the central point video surveillance system infrastructure, equipment called "Receivers" 103 (Receiver 1) and 104 (Receiver 2) connect a plurality of cameras 108 (Camera 1), 109 (Camera 2), 110 (Camera 3), 111 (Camera 4), 112 (Camera 5), and 113 (Camera 6) to a LAN infrastructure 102.

Each receiver provides power to the cameras through coax cables 121, 122 and 123. The Receiver encapsulates uplink IP LAN traffic received from its LAN interface into packets suitable for digital data transport over Coax cables such as HomePlug AV packets and transmits them on the Coax interfaces. The Receiver also extracts IP LAN traffic from packets received on the downlink coax interfaces and forwards them on the LAN interface.

The main coax cables can be used either for connecting one or several cameras. For example camera 110 is directly connected to the main coax cable 122 while cameras 109 and 108 are connected to the main coax cable 121 by "T" style connectors. Such connectors can be used for extending the number of cameras connected to a main coax cable.

The LAN infrastructure 102 includes switches, routers and gateways for transporting the IP video to the VMS ("Video Monitoring System") 101.

The VMS ("Video Monitoring System") 101 displays the IP video streams for the surveillance purpose. Also, the VMS 101 displays a user interface enabling the operator to configure the cameras, to change the cameras power profile and to receive power alerts from the cameras.

One example of Receiver is the NV-ER1804 TBus™ from NVT™.

Receivers 103 and 104 are not represented in details in the present FIG. for the sake of conciseness. Only the power supply details are shown.

Receiver 103 gets power from a standard AC power outlet (110 or 220 volts). The AC power is converted to DC power suitable for cameras (for example 48 or 56 volts) by an AC/DC converter 106. In the present example, the AC/DC converter can handle up to 250 Watt of total power. The DC power is distributed from the converter 106 to each port (e.g. 107). Each port has its own power protection to limit the amount of power that can be drawn from the port. In the present example, it can be drawn up to 75 Watts from each port. However, the AC/DC converter 106 cannot handle the situation where all ports would deliver their full power capacity.

Based on this receiver architecture, the cameras are sorted into port sets 114 (port 2), 115 (port 4) and 118 (port 3). The port sets are part of group sets 117 (group 1) and 118 (group 2).

Camera 108 and Camera 109 are part of port set 114 because they are both connected to the port "number 2" (port 2) of receiver 103. Thus, these two cameras share a total power budget of 75 Watt.

Camera 110 is the single member of the port set 115 and has access to a total power budget of 75 Watts from the port "number 4" (port 4) of receiver 103.

Also, all cameras of group set 117 share the total power capacity of the receiver 103 (250 Watts in the present example). It means that the sum of the power consumed in each port set included in group set 117 must not exceed 250 Watts in the present example.

Figure 1B:
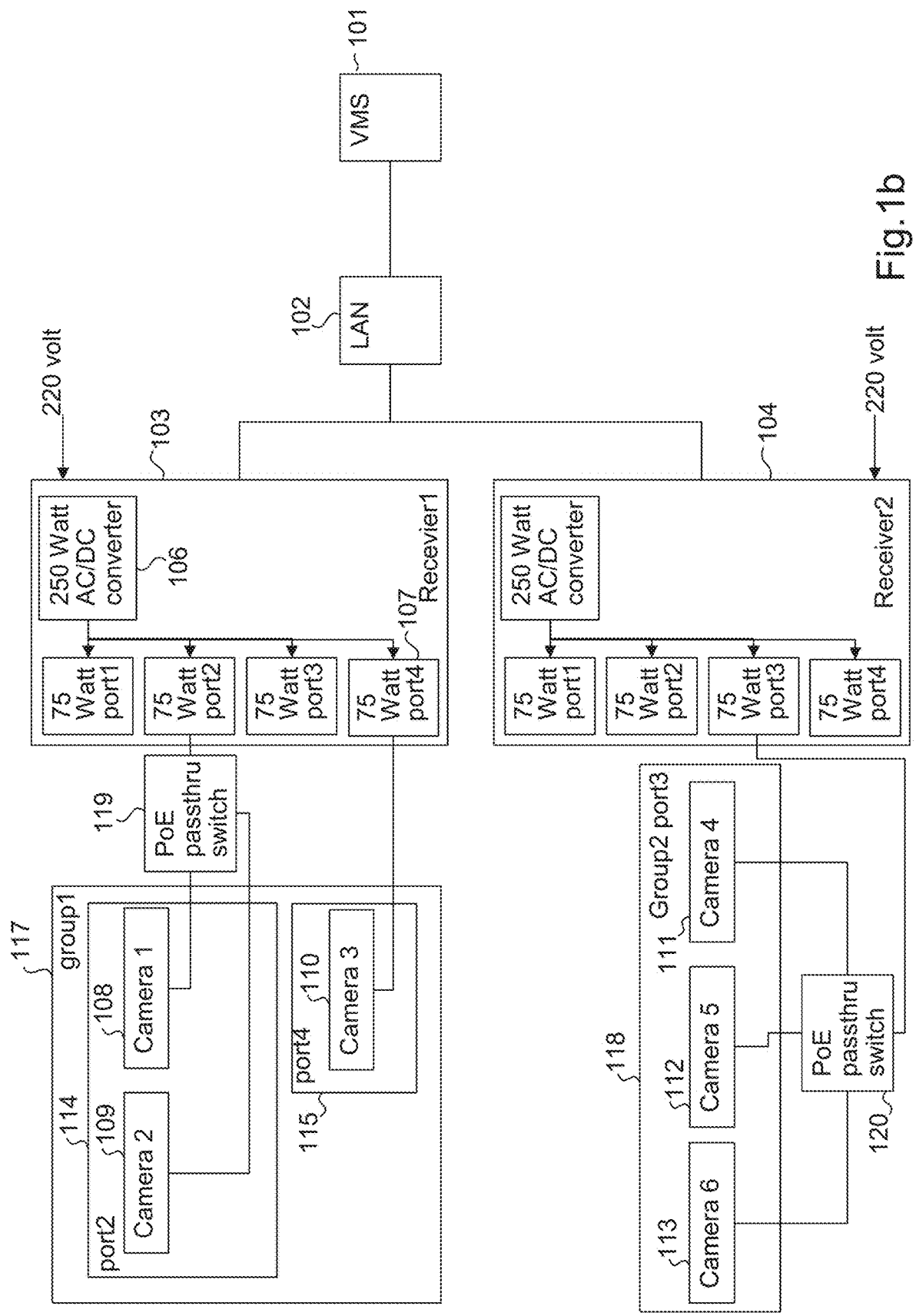

FIG. 1b schematically illustrates an Ethernet video surveillance system. The elements in common with the system of FIG. 1a have the same references and are not described again.

In the present example, the receivers 103 and 104 provide power to the cameras through Ethernet cables and are PoE enabled Ethernet switches.

One camera can be directly connected to one port of the Receiver, or several cameras can be connected to one port of the Receiver through an intermediate PoE pass-through switch (119, 120).

For example camera 110 is directly connected to "port 4" 107 of receiver 103 while cameras 109 and 108 are connected to "port 2" of receiver 103 through the intermediate PoE pass-through Ethernet switch 119.

PoE pass-through switches are configured to receive power from one dedicated port and then to distribute the received power to the remaining ports. (Cisco Catalyst® 3560-C and 2960-C Series Switches are examples of PoE pass-through switches).

The LAN infrastructure 102 includes switches, routers and gateways for transporting the IP video to the VMS 101.

The VMS ("Video Monitoring System") 101 displays the IP video streams for the surveillance purpose. Also the VMS 101 displays a user interface allowing the operator to configure the cameras, to change the cameras power profile and to receive power alerts from the cameras (FIG. 2).

An example of Receiver is the Netgear® GS110TP smart switch.

Figure 2:
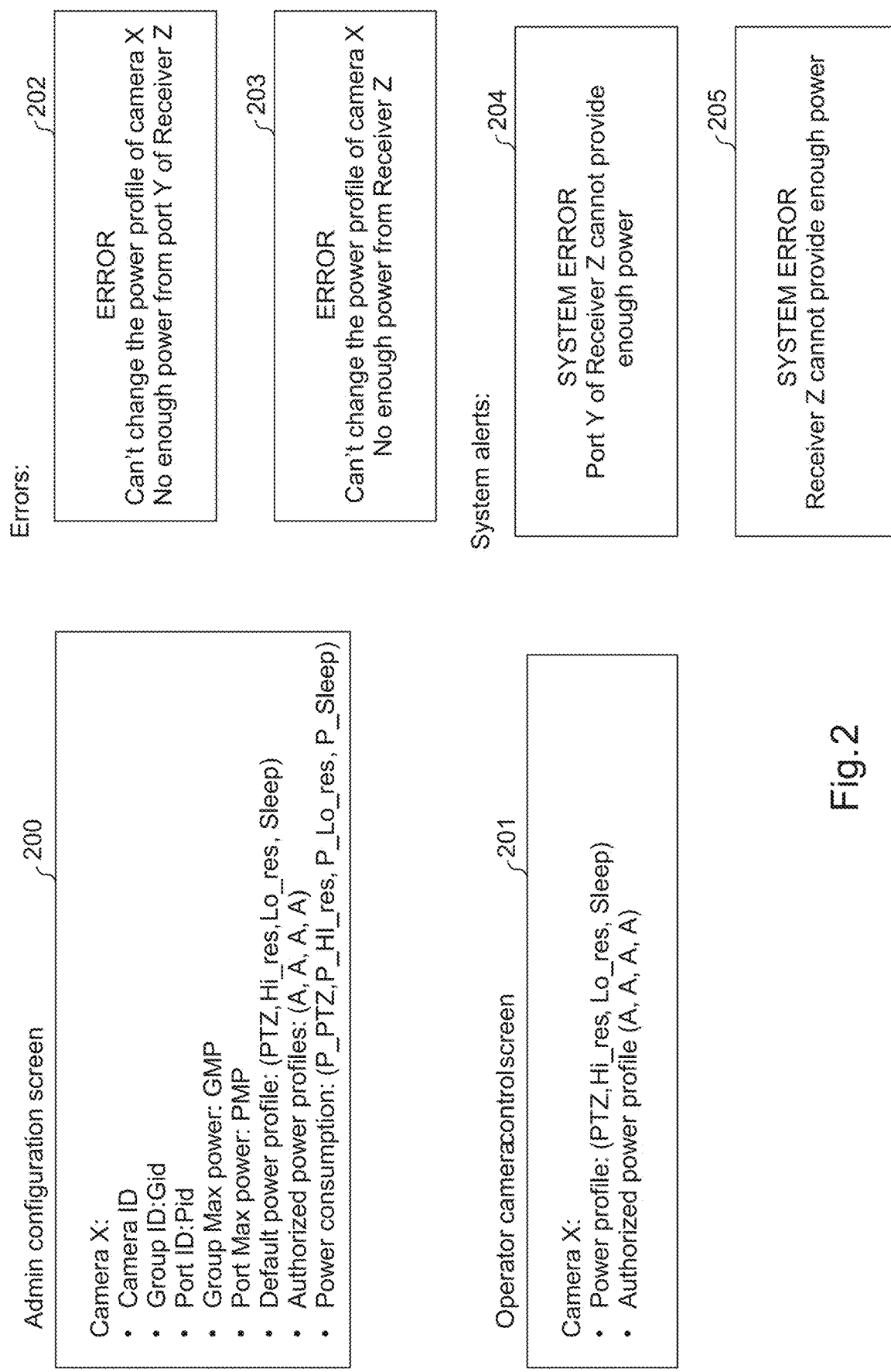
FIG. 2 illustrates exemplary information that may be displayed on a VMS screen according to embodiments, FIG. 3 schematically illustrates different embodiments of a surveillance camera, FIG. 3a schematically illustrates an integrated IP over coax surveillance camera according to embodiments, FIG. 3b schematically illustrates an IP surveillance camera according to embodiments, FIG. 3c schematically illustrates a modular IP over coax surveillance camera according to embodiments, FIG. 4a schematically illustrates data processed by a camera CPU according embodiments.

With reference to FIG. 2, information that can be displayed and modified by the VMS 101 is described.

The "admin configuration screen" 200 is managed by the system administrator mainly during the system installation and configuration. The screen shows the parameters that a system administrator can configure for each camera. The parameters include:

Camera ID: an identification of the camera.
Group ID: an identification of the Receiver that provides the power to the Camera. For example, according to FIGS. 1a and 1b, cameras 108, 109 and 110 shall be configured with group id set to "Recevier1" while cameras 113, 112 and 111 have a group id set to "Recevier2".
Port ID: an identification of the Receiver port that provides power to the camera. For example, according to FIGS. 1a and 1b cameras 108 and 109 have a port id set to "2", camera 110 has a port id set to "4" and cameras 113, 112 and 111 have a port id set to "3".
Group max power: this parameter reflects the maximum power that can be delivered by the Receiver that provides power to the camera. For example, according to FIGS. 1a and 1b, all cameras shall have the group max power set to 250 watt.
Port max power: this parameter reflects the maximum power that can be delivered by the port of the receiver that provides power to the camera. For example, according to FIGS. 1a and 1b, all cameras shall have the group max power set to 75 watt.
Default power profile: this parameter defines the power profile of the camera after a cycle power on. Four illustrative possible profiles are described:
PTZ: the camera movements are allowed including the optical zoom setup,
Hi_res: the camera can be set to the highest image resolution, camera movements are not allowed,
Lo_res: the camera cannot be set to high resolution and the camera movements are not allowed,
Sleep: the camera is not allowed to stream video and the camera movement are not allowed,
Authorized power profiles: this parameter defines the power profile that the administrator wants to authorise for the camera. For example, if an administrator wants that the camera never to be in sleep mode and it doesn't want to set a particular resolution or the ability to move, then the administrator sets (1,1,1,0) as the authorized power profiles for the set of profiles (PTZ, Hi_res, Lo_res, Sleep), where "1" indicates that the corresponding profile is authorized and "0" indicates that the corresponding profile is not authorized.
Power consumption: this parameter defines the camera power consumption in the different profiles:
P_PTZ: power consumed by the camera when in PTZ profile,
P_HI_res: power consumed by the camera when in Hi_res profile,
P_Lo_res: power consumed by the camera when in Lo_res profile,
P_Sleep: power consumed by the camera when in Sleep profile.

When the system administrator sets or changes a camera configuration, then the VMS sends an "Admin update" message (561, see FIG. 5a) to the camera.

The "operator camera control" screen 201 is used by the VMS operator during the system operation. This screen enables the operator to dynamically manage the camera power profiles. For example, during operation, the operator might want to increase the resolution of one particular camera, or change the angle of view or wakeup a sleeping camera. To do so, the operator goes to the "operator camera control screen" 201, checks whether the camera is in the appropriate power profile corresponding to the desired modification, and if necessary, changes the camera power profile and/or authorized power profile.

When the operator changes the camera power profile in screen 201, a change PP (acronym for "power profile") message (531, see FIG. 5a) is sent by the VMS 101 to the camera to instruct it to change the power profile. Then, the camera might negotiate with other cameras a share in the global power budget. When the camera power profile change is successful, then the camera sends a positive CPP acknowledgement (acronym for "change power profile") message (551, see FIG. 5a) to the VMS 101 and the new camera power profile is displayed in screen 201. If the camera failed to change the power profile, then the camera sends a negative CPP acknowledgement message (531, see FIG. 5a) to VMS 101, screen 201 still displays the old camera power profile and an error screen 202 or 203 pops up.

Error screen 202 indicates that camera X cannot change its power profile because port Y of receiver Z cannot provide enough power for that profile.

Error screen 203 indicates that camera X cannot change its power profile because receiver Z cannot provide enough power for that profile.

System alert screens can popup mainly at system start up. These alerts are provided for detecting a system misconfiguration. If the system administrator failed to configure the camera default power profiles to match the receivers capacity. Alert messages (571, see FIG. 5a) are sent by the cameras at start up. VMS 101 pops up the system error screen 204 if a receiver port does not have the capacity to power the cameras with their respective power profiles, or the system error screen 205 if a receiver does not have the global power capacity for all ports.

Cameras according to embodiments are described in what follows with reference to FIGS. 3, 3a, 3b and 3c.

FIG. 3 illustrates three different embodiments of this invention. A coax camera 1501, an IP camera 1502 and a modular coax camera 1505 are represented.

The coax camera 1501 is a network surveillance camera with integrated IP over Coax interface. An example is represented by FIG. 3a.

The IP camera 1502 is a network surveillance camera. An embodiment of an IP camera is illustrated by FIG. 3b.

The modular IP over coax camera 1505 comprises an IP camera 1502 connected by an Ethernet cable 1504 to a coax over IP adapter 1503. The modular IP coax camera according to an embodiment is represented by FIG. 3c.

Figure 3A:
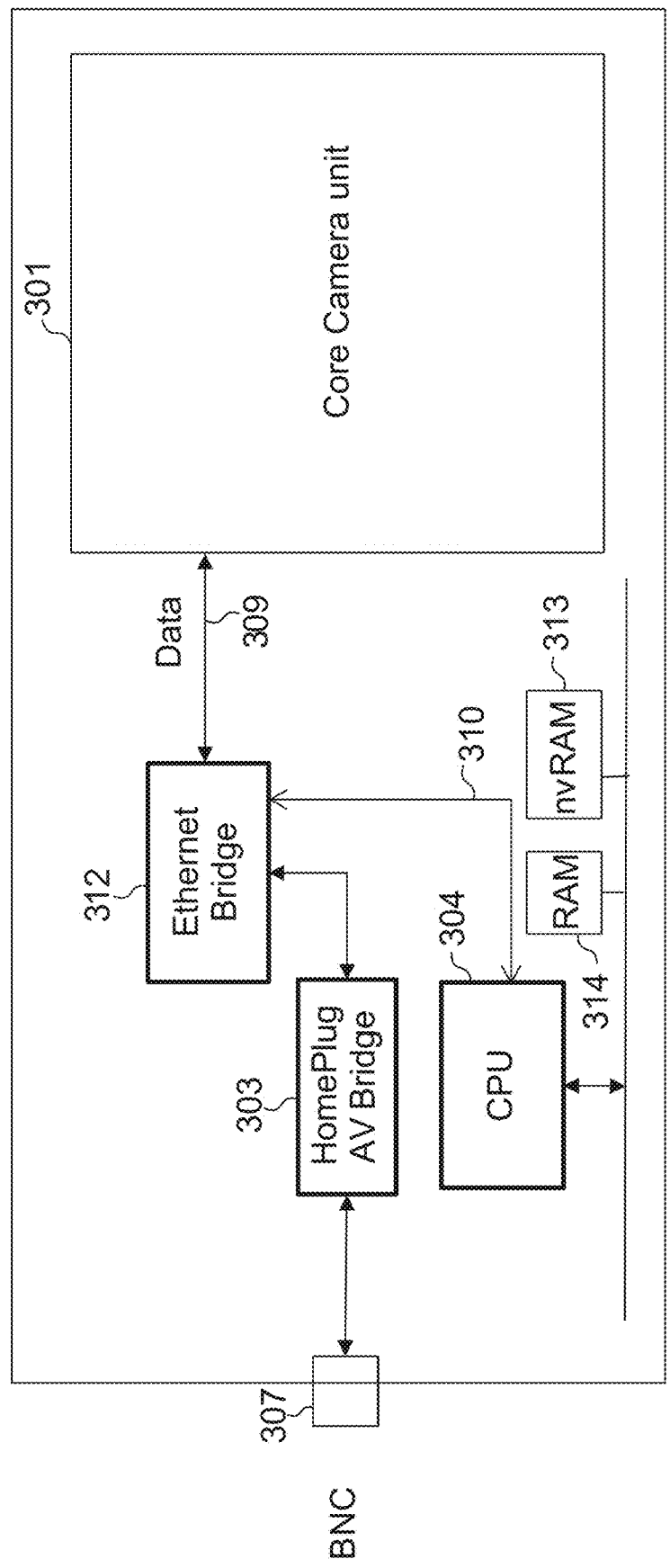
Figure 3B:
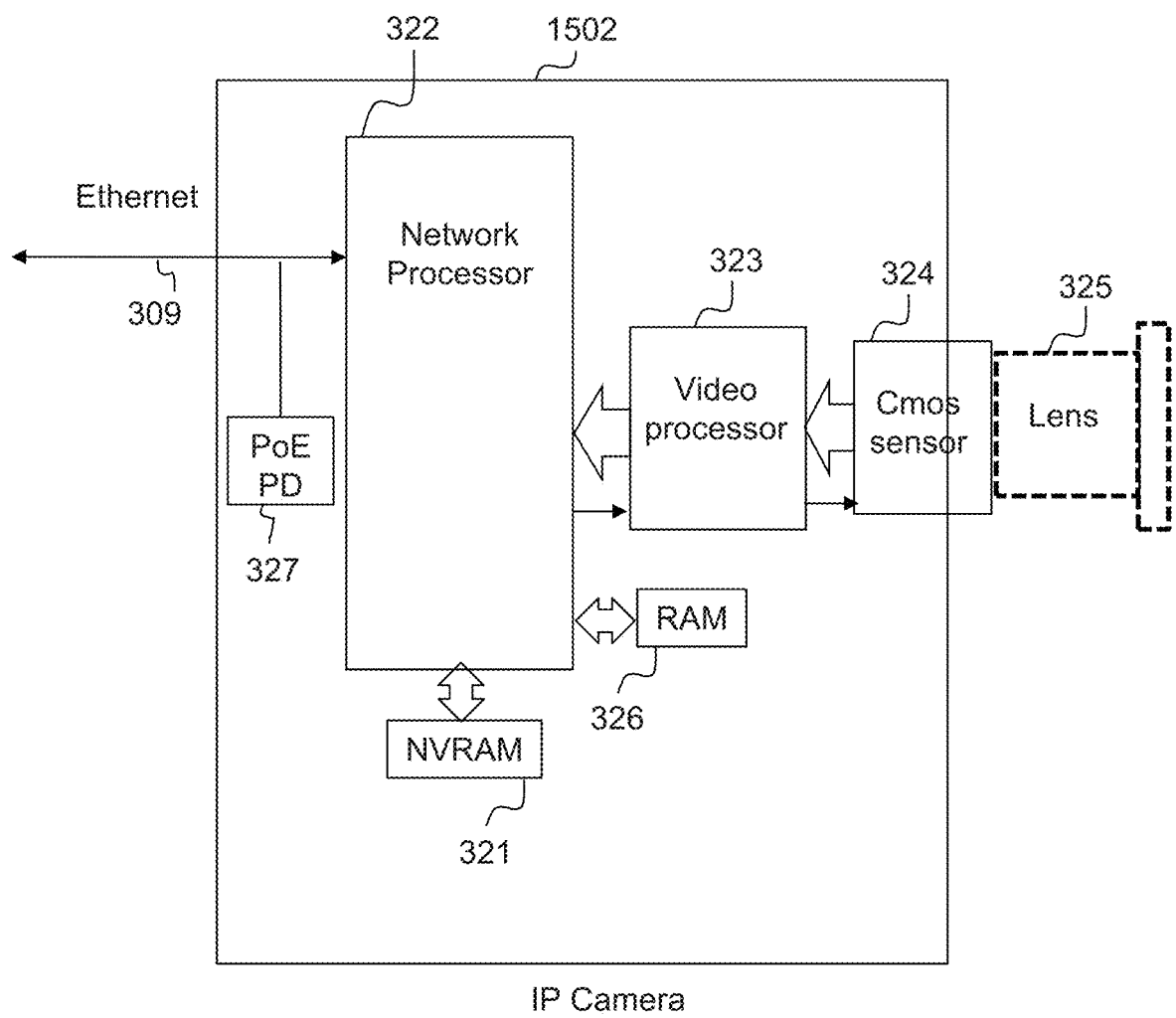
Figure 3C:
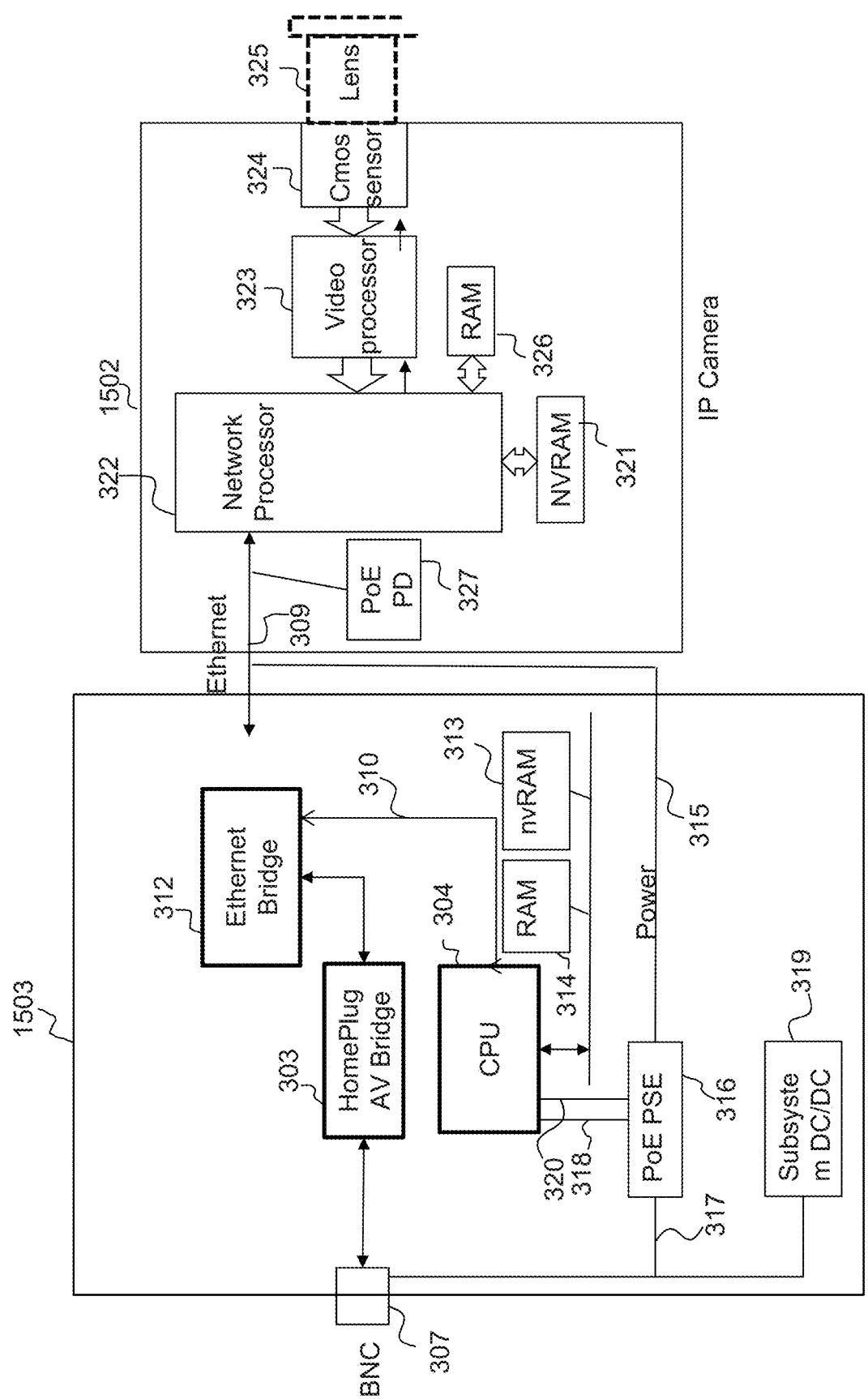

FIG. 3a illustrates a coax camera 1501 according to an embodiment. For the sake of conciseness, the following description focuses mainly on the relevant parts of the camera which has been represented in a simplified fashion.

A core camera unit 301 is represented that includes the large part of the camera functions such as the optics, the sensor, the video processor and the RTP/IP video server.

An EoC unit 303 includes the functions of Ethernet transport over coaxial cable and power management. This unit is used for IP over coax (such as in FIG. 1a). For Ethernet camera (such as in FIG. 1b) the EoC unit 303 is not used.

A RJ45 port (not represented by the FIGS.) may be used if the camera is part of an Ethernet system (such as in FIG. 1b).

The BNC port 307 is used for IP communication over coax cable (such as in FIG. 1a).

The CPU 304 manages the power profile in accordance with the power budget in the camera. It gets power parameters from the non-volatile memory nvRAM 313 when it is powered, it exchanges messages with the VMS 101 and other cameras through the Ethernet bridge 312. The power parameters are kept in the RAM 314 during run time.

The camera gets its power from the BNC port 307 (coax system, such as in FIG. 1a).

According to another embodiment (not represented by the FIGS.), the camera may get its power from a RJ45 port (Ethernet system, such as in FIG. 1b).

The HomePlug AV bridge 303 is configured to encapsulate the core Camera IP traffic into HomePlug AV packets and to send them on the Coax cable through the BNC port 307. The HomePlug AV bridge 303 is also configured to extract IP traffic from the received HomePlug AV packets and to forward this IP traffic to the Camera Core Unit.

The Ethernet bridge 312 is configured to mix IP traffics from the HomePlug AV bridge 303 and the Core Camera Unit.

An example of HomePlug AV bridge is the Devolo® dLAN 200 AVmodule (INT6400).

The flowcharts described below with reference to FIGS. 6, 7, 8 and 13 are executed by the CPU 304. This embodiment is particularly advantageous for IP over Coax systems since the camera is integrated thus generating cost saving for maintenance and installation.

FIG. 3b illustrates an IP camera according to an embodiment of the invention. In order to keep the readability of the diagram and to focus mainly on the invention the diagram of the camera has been simplified. The camera 1502, the optics, the sensor, the video processor and the RTP/IP video server are here after described in a simplified manner.

The camera 1502 comprises a lens 325, a sensor such as a Cmos sensor 324, a video processor 323, a network processor 322, a non-volatile memory 321 and a RAM memory 326, both associated to the network processor 322. The camera gets power from the Ethernet port 309 by a PoE PD ("Powered device") module 327.

The flowcharts described below with reference to FIGS. 6, 7, 8 and 13 are executed by the network processor 322. This embodiment is particularly advantageous since it can be applied in standard Ethernet systems.

FIG. 3c illustrates a modular coax camera 1505 according to an embodiment of the invention. In order to keep the readability of the diagram and to focus mainly on the invention the diagram of the camera has been simplified.

As described with reference to FIG. 3, the modular IP over coax camera 1505 comprises an IP camera 1502 connected by an Ethernet cable 1504 to a coax over IP adapter 1503.

The IP camera unit 1502 includes the large part of the camera functions including the optics, the sensor, the video processor and the RTP/IP video server but it here after described in a simplified manner.

The IP over coax adapter unit 1503 includes the functions of Ethernet transport over coaxial cable and of power from coaxial cable.

The method of managing power according to the invention is mainly implemented in the CPU 304 (MICA "Modular IP over coax-adapter focus") or in the network processor 322 (MICC "Modular IP over coax—camera focus").

A BNC port 307 is used for IP communication over coax cable.

A CPU 304 manages for example the core camera start and stop and the election of a Master camera. The CPU 304 stores the power change record 410 in the NVRAM 313. It exchanges messages with other cameras through the Ethernet bridge 312.

The camera gets its power from the BNC port 307. The power is directed through the line 317 to both the subsystem DC/DC converter 319 and the PoE PSE ("Power Sourcing Equipment") module 316. The DC/DC converter 319 is responsible to provide power to the IP over coax adapter, mainly the communication subsystem (312, 303, 304, 314, 313, 316, 319). The PoE PSE module 316 is responsible to provide power to the IP camera unit 1502. The PoE PSE module 316 is controlled by the CPU 304 through the signal 318. By acting on the signal 318, the CPU 304 will control the power to be delivered to IP camera 1502.

The HomePlug AV bridge 303 is responsible for encapsulating the core Camera IP traffic into HomePlug AV packets and to send them on the coaxial cable through the BNC port 307. The HomePlug AV bridge 303 is also responsible to extract IP traffic from the received HomePlug AV packets and to forward this IP traffic to the IP Camera unit 1502.

The Ethernet bridge 312 is responsible for mixing IP traffics from the HomePlug AV bridge 303 and the IP camera unit 1502.

An example of HomePlug AV bridge is the dLAN 200 AVmodule (INT6400) from Devolo.

The IP camera unit 301 is composed of a lens 325, a sensor such as a Cmos sensor 324 a video processor 323, a network processor 322 and a non-volatile memory 321 and a RAM memory 326, both associated to the network processor 322.

The MICA modular IP over Coax embodiment system target is described in FIG. 1a. The method of managing power according to the invention is mainly implemented in a modular IP over Coax camera 1505 and more precisely in the IP over Coax adapter 1503. In particular, the flowcharts of FIGS. 6, 6a, 7, 8 and 13 are executed by the CPU 304.

This embodiment is particularly advantageous for IP over Coax systems since it offers the flexibility of choosing separately the camera and the adapter.

The MICC modular IP over Coax embodiment system target is described in FIG. 1a. The method of managing power according to the invention is mainly is implemented in a modular IP over Coax camera 1505 and more precisely in the IP camera 1502. In particular, the flowcharts of FIGS. 6, 6b 7, 8 and 13 are executed by the network processor 322. This embodiment is particularly advantageous for IP over Coax systems since it offers the flexibility of choosing separately the camera and the adapter like the MICA, and additionally it has the advantage of more precise power consumption calculations thanks to the power consumption values exchanged between the IP camera and the IP over Coax adapter.

Figure 4A:
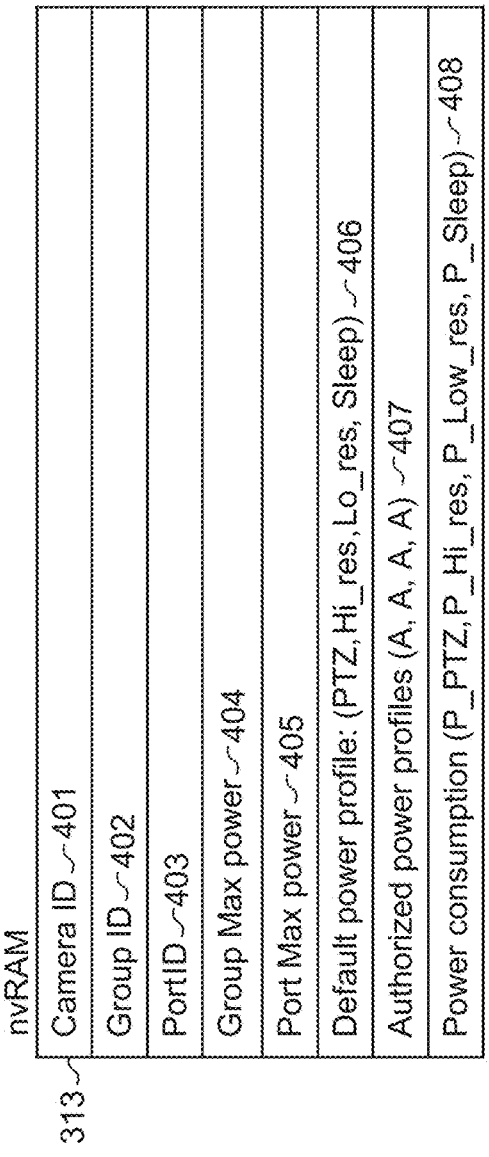
FIG. 4b illustrates the data stored in the IP over Coaxial adapter NVRAM for power consumption according to embodiments, FIG. 5a schematically illustrates messages that may be exchanged between a camera and a VMS according to embodiments.
Figure 4A:
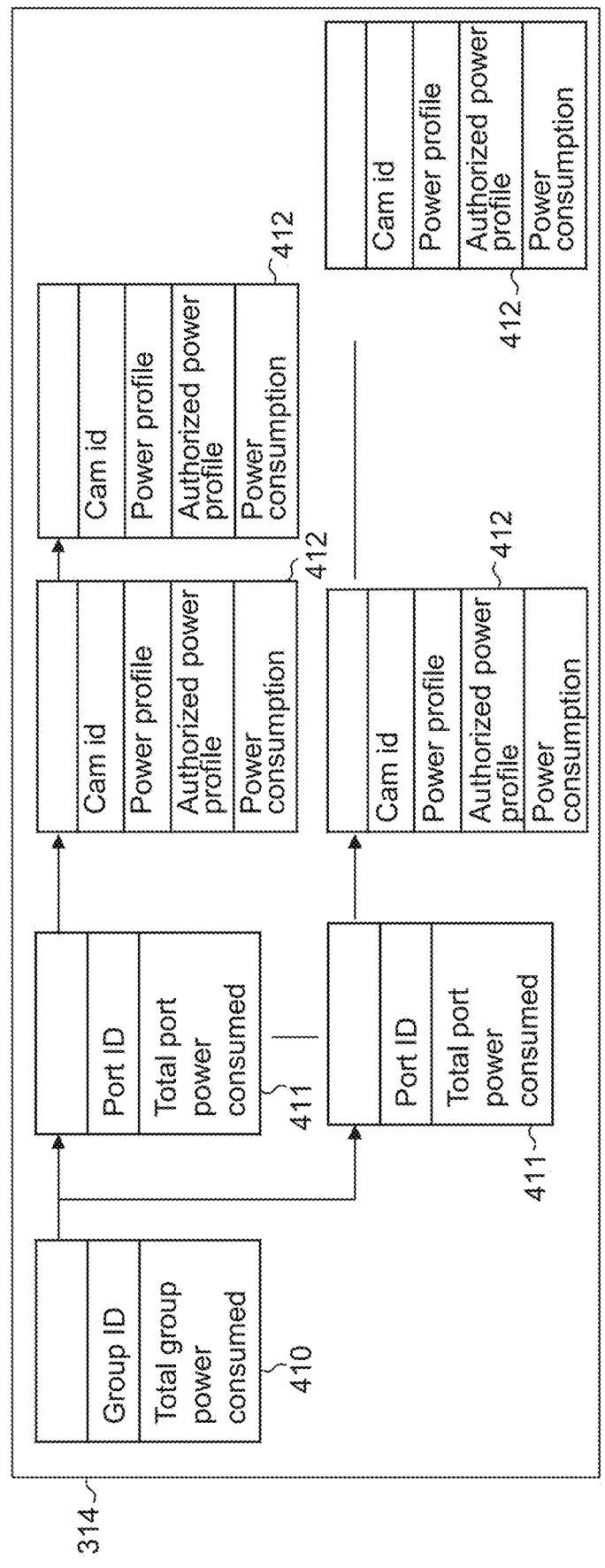

The data processed by the camera CPU 304 (FIG. 3a), the adapter CPU 304 (FIG. 3c) and the network processor 322 (FIG. 3b) is described in what follows with reference to FIG. 4a.

Depending on the camera embodiment, the power parameters are stored in the non-volatile memory 313 (FIGS. 3a and 3c) or in the non-volatile memory 321 (FIG. 3b). These parameters may be default factory parameters that can be overwritten by the camera during operation when instructed by the VMS 101 upon request of the administrator for change of the values of the "admin configuration" screen 200.

The nvRAM 313 parameters include:

Camera ID (401): an identification of the camera

Group ID (402): an identification of the Receiver that provides the power to the Camera. For example, according to FIGS. 1a and 1b, cameras 108, 109 and 110 shall be configured with group id set to "Recevier1" while cameras 113, 112 and 111 have a group id set to "Recevier2".

Port ID (403): an identification of the receiver port that provides power to the camera. For example, according to FIGS. 1a and 1b, cameras 108 and 109 have a port id set to "2", camera 110 has a port id set to "4" and cameras 113, 112 and 111 have a port id set to "3".

Group max power (404): this parameter reflects the maximum power that can be delivered by the receiver that provides power to the camera. For example, according to FIGS. 1a and 1b, all cameras shall have the group max power set to 250 watt.

Port max power (405): this parameter reflects the maximum power that can be delivered by the port of the receiver that provides power to the camera. For example, according to FIGS. 1a and 1b, all cameras shall have the group max power set to 75 watt.

Default power profile (406): this parameter defines the power profile of the camera after a cycle power on. Four illustrative possible profiles are described:

PTZ: the camera movements are allowed including the optical zoom setup,

Hi_res: the camera can be set to the highest image resolution, camera movements are not allowed, Lo_res: the camera cannot be set to high resolution and the camera movements are not allowed, Sleep: the mare is not allowed to stream video and the camera movement are not allowed, Authorized power profiles (407): this parameter defines the power profile that the administrator wants to authorise for the camera. For example, if an administrator wants the camera never to be in sleep mode and if resolution and the ability to move are not of importance, then the administrator sets (1,1,1,0) as the authorized power profiles for the set of profiles (PTZ, Hi_res, Lo_res, Sleep), where "1" indicates that the corresponding profile is authorized and "0" indicates that the corresponding profile is not authorized.

Power consumption (408): this parameter defines the camera power consumption in the different profiles:

P_PTZ: power consumed by the camera when in PTZ profile,

P_HI_res: power consumed by the camera when in Hi_res profile,

P_Lo_res: power consumed by the camera when in Lo_res profile,

P_Sleep: power consumed by the camera when in Sleep profile.

During run time camera CPU 304 or adapter CPU 304 (FIGS. 3a and 3c) manages the available power budget and its own power profile by maintaining a data structure in the RAM 314. According to the camera embodiment represented by FIG. 3b, during run time network processor 322 manages the available power budget and its own power profile by maintaining a data structure in the RAM 326.

This data structure comprises one or more Group objects 410 containing:

The group ID as set in the Group ID parameter 402,

The total group power consumed: the sum of the power profiles of all the camera connected to the Receiver, Pointer to port objects: each port of the Receiver is represented by a port object 411, The port object 411 contains:

The port ID as set in the port ID parameter 403,

The total port power consumed: the sum of the power profiles of all the camera connected to the Receiver port, Pointer to camera object: each camera is represented by a camera object 412, The camera object 412 contains:

The camera ID: local id as set in the Camera ID parameter 401 or id of the other cameras as the CPU is receiving "Network join" messages (501, see FIG. 5a) or "PP info" message (521, see FIG. 5a), The Power profile: as set in the default power profile parameter 406, or as modified by the VMS ("Change PP" message 531, see FIG. 5a) if local camera or as set in "Network join" messages (501, see FIG. 5a) or "PP info" message (521, see FIG. 5a) from other camera, Authorized power profile: as set in the "authorized power profiles" parameter 407 or as modified by VMS ("Change APP" message 551, see FIG. 5a) if local camera, or as set in "Network join" messages (501, see FIG. 5a) from other camera, Power consumption information as set in the "power consumption" parameter 408.

Figure 4B:
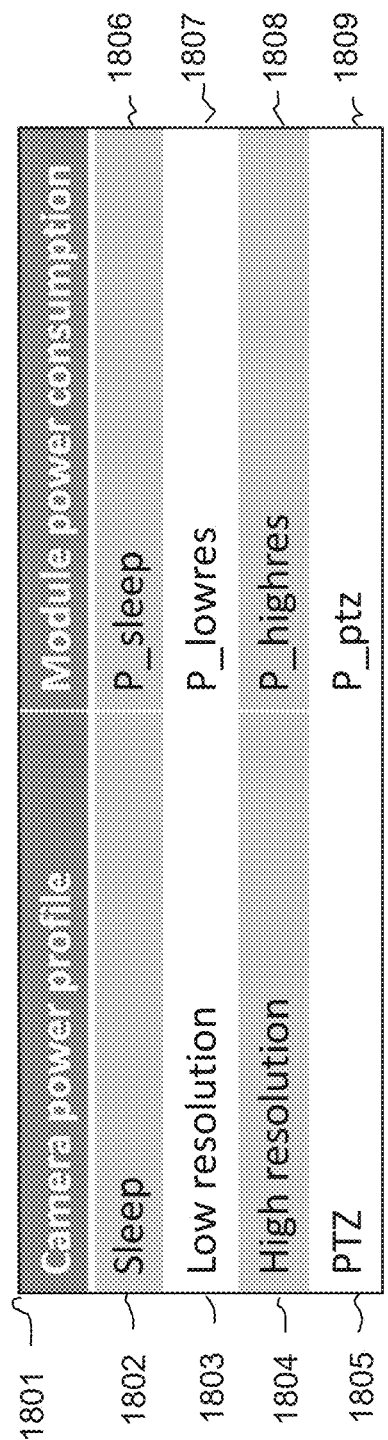
Figure 5A:
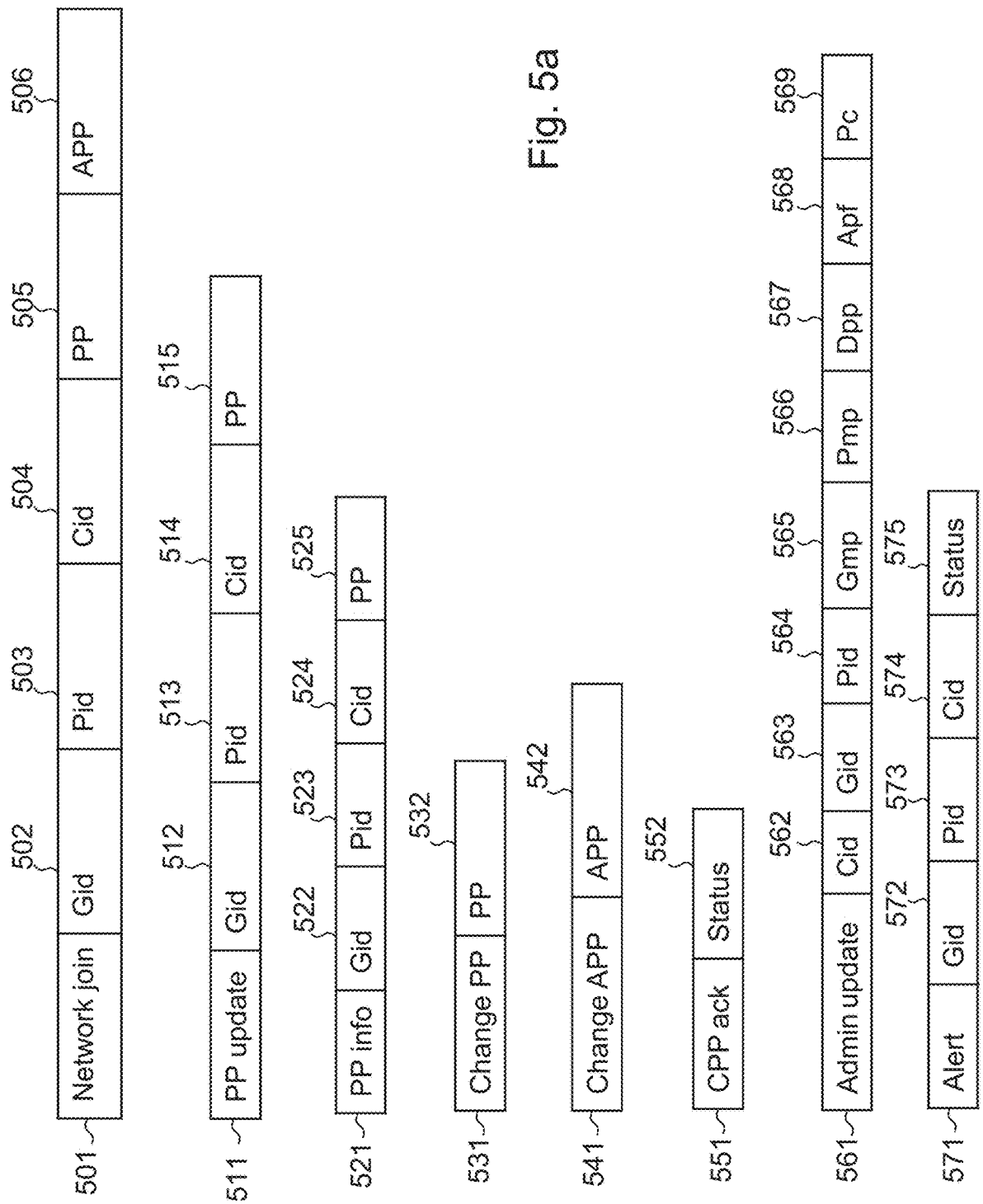
FIG. 5b illustrates the messages that may be exchanged between the IP camera and the IP over Coax adapter according to embodiments.

FIG. 4b illustrates the data stored in the IP over Coax adapter NVRAM 313 for power consumption. The data structure 1801 reflects the power consumption of the IP over Coax adapter 1503. It is initialized either in factory or as a maintenance or installation process. If the power consumption of the 1503 is constant then all the fields 1806, 1807, 1808, and 1809 are set to the same value of power consumption. If the adapter manufacturer notices a significant difference in power consumption of the adapter 1503 when the associated camera is in different known states then:

The field 1806 represents the power consumed by the IP over Coax adapter 1503 when the camera is in sleep mode The field 1807 represents the power consumed by the IP over Coax adapter 1503 when the camera is in low resolution mode The field 1808 represents the power consumed by the IP over Coax adapter 1503 when the camera is in high resolution mode The field 1809 represents the power consumed by the IP over Coax adapter 1503 when the camera is in PTZ mode The messages exchanged between the cameras and the VMS are described with reference to FIG. 5a.

Upon initialization of the system (upon start-up or powering-up), each camera sends a "network join" message 501. This message is sent in broadcast mode so that every camera and the VMS can receive it. The message contains the "group id" 502, the "port id" 503, the "camera id" 504, the "power profile" 505 and the "authorized power profile" 506 of the sending camera.

When a camera changes its power profile, it broadcasts a "PP update" message 511 to all other cameras. The message contains the "group id" 512, the "port id" 513, the "camera id" 514 and the new "power profile" 515 of the sending camera.

When a camera detects a new camera in the system, it sends its own power profile to the new camera by sending a "PP info" message 521. The massage contains the "group id" 522, the "port id" 523, the "camera id" 524 and the "power profile" 525 of the sending camera.

When the VMS operator changes the power profile of a camera through screen 201, the VMS sends a "change PP" message 531 to that camera. Also, when a remote camera wants to change the power profile of another camera, the remote camera sends a "change PP" message 531 to that camera. The message contains the new "power profile" 532.

When the VMS operator changes the "authorized power profile" of a camera through screen 201, the VMS sends a "change APP" message 541 to that camera. The message contains the new "authorized power profile" 542.

When a camera completed the change of its own power profile, upon request of the VMS or upon request of another camera, it sends back a "CPP ack" message 551 to the requesting device (VMS or camera) to indicate the status of the change attempt (OK when the change attempt has succeeded, KO PORT when the change has not succeeded because of the port, KO RECEIVER when the change has not succeeded because of the receiver). The massage contains a "status" field 552.

When an administrator changes the camera configuration through the VMS screen 200, the VMS sends an "admin update" message 561 to the camera. The message contains the "camera id" 562, the "group id" 563, the "port id" 564, the "group maximum power" 565 the "port maximum power" 567, the "default power profile" 567, the "authorized power profile" 568, the "camera power consumption" for each power profile 569.

When a camera detects a situation where the receiver will not be able to handle all the cameras with their respective power profiles, its sends an "alert" message 571 to the VMS. The message contains the "group id" 572 and "port id" 573 of the receiver to which the camera is connected, the "camera id" 574 and a "status" 575:

RECEIVER: The receiver port can handle the cameras, but the total power capacity of the receiver is reached,
PORT: The receiver port cannot handle the cameras.

FIG. 5b illustrates the messages that may be exchanged between the IP camera 1503 and the IP over Coax adapter 1502. The message "switch to power profile" 1830 is sent by the adapter CPU 304 of the IP over Coax adapter 1502 (MICA implementation) to the network of the attached IP camera 1503. The format of the message can be, and is not restricted to, an Ethernet frame compliant to the SNMP protocol, or any other level protocols that uses Ethernet packets. Of course it can be also a packet conformant to the IP (TCP or UDP or higher).

The field "power profile" 1831 contains a new power profile for the IP camera 1503. When receiving the message the network processor 322 must set the camera 1503 to the power profile as indicated in the field 1831.

The message "get module power consumption" 1801 is sent by the network processor 322 of an IP camera to the CPU 304 of the locally attached IP over coax adapter 1502 (MICC implementation). The format of the message can be, and is not restricted to, an Ethernet frame compliant to the SNMP protocol, or any other level protocols that uses Ethernet packets. Of course it can be also a packet conformant to the IP (TCP or UDP or higher).

Upon reception of a "Get module power consumption" message 1801, the adapter CPU 304 must respond with a "Module power consumption response" message 1810.

This "Module power consumption response" message 1810 contains:

A field 1811 which contains the power consumed by the IP over Coax adapter 1503 when the camera is in sleep mode and is set to NVRAM field 1806 (see FIG. 4b), A field 1812 which contains the power consumed by the IP over Coax adapter 1503 when the camera is in low resolution mode and is set to NVRAM field 1807, A field 1813 which contains the power consumed by the IP over Coax adapter 1503 when the camera is in high resolution mode and is set to NVRAM field 1808, and A field 1814 which contains the power consumed by the IP over Coax adapter 1503 when the camera is in PTZ mode and is set to NVRAM 1809 field.

The format of the message can be, and is not restricted to, an Ethernet frame compliant to the SNMP protocol, or any other level protocols that uses Ethernet packets. Of course it can be also a packet conformant to the IP (TCP or UDP or higher).

Figure 6:
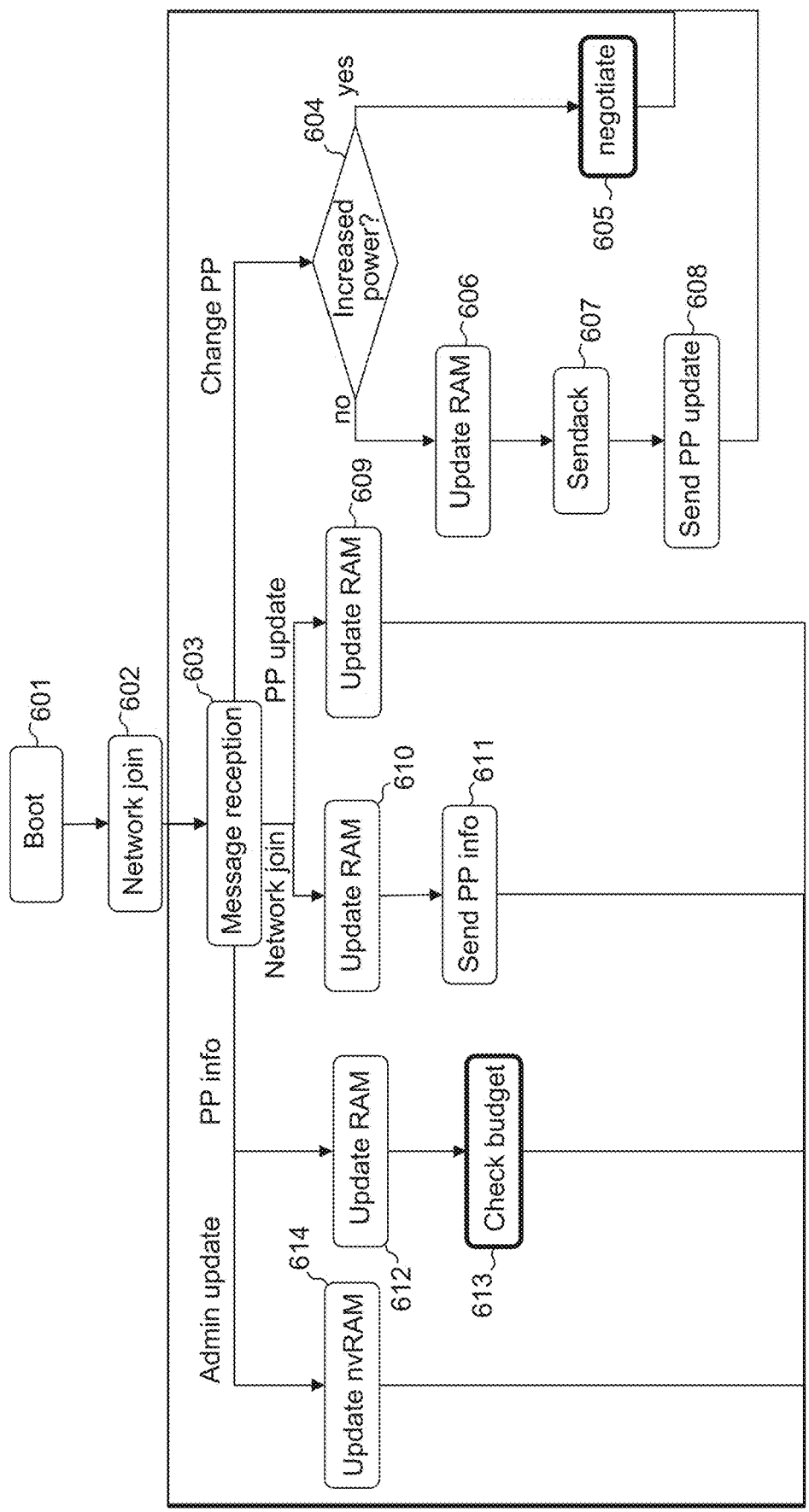
FIG. 6 is a flowchart of steps carried out by a camera CPU or an adapter CPU when powered according to embodiments.

Power budget management according to embodiments is described in what follows with reference to FIG. 6 which is a flowchart of exemplary steps executed by the camera CPU 304 or the adapter CPU 304 when powered.

In particular, the steps of the flowchart are executed by the camera CPU 304 for the camera embodiments represented by FIG. 3a, and by the adapter CPU 304 for some embodiments represented by FIG. 3c. When, depending on the camera embodiment, the camera CPU or the adapter CPU is powered, it executes all necessary actions during the boot phase 601 in order to be ready for the run time. These actions include the initialization of the peripherals such as the RAM 314, the nvRAM 313 and the communication link 310 of the camera or the adapter respectively.

In order to make easier the reading of the description below concerning the flowchart, the camera CPU 304, the adapter CPU 304 are named CPU. Camera elements such RAM, nvRAM may be elements of the camera (for embodiments represented by FIG. 3a) or of the adapter (for embodiments represented by FIG. 3c) depending on the implemented embodiment.

Concerning camera embodiments represented by FIG. 3a (steps flowchart executed by the camera CPU 304), during the RAM initialization, the CPU creates the group object 410 set with a group identification read from nvRAM group ID 402. The total group power consumed is set to the camera default power profile obtained from nvRAM 406. Next, the CPU creates a port object 411 with a port identification read from nvRAM 403 and the same power consumed as the group object. The CPU also creates a camera object set with the camera identification 401, power profile 406 and authorized power profile 407 read from nvRAM. The CPU then links the three objects, first from group to port and then from port to camera. In other words, the CPU sets the group object pointer to point to the port object and then the CPU sets the port object pointer to point to the camera object.

Concerning camera embodiments represented by FIG. 3c in which steps flowchart are executed by the adapter CPU 304, the boot phase 601 comprises several supplementary steps concerning the communication of the network processor 322 and the adapter CPU 304 for camera power profile initialization.

Figure 6A:
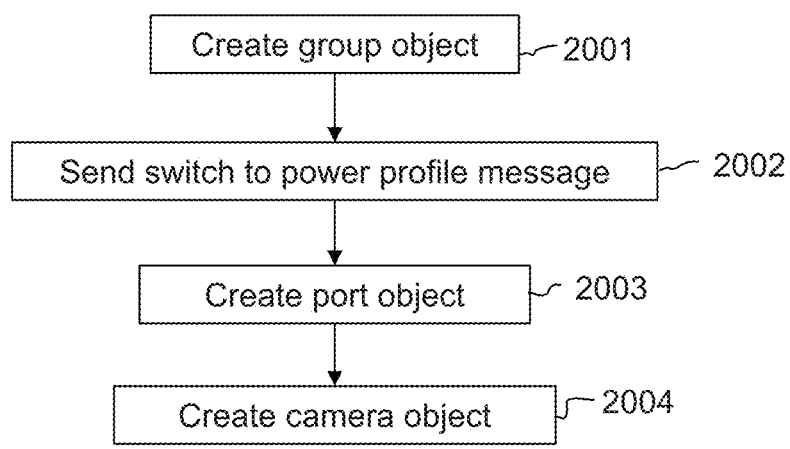
FIG. 6a is a flowchart of additional steps in step 601 of FIG. 6 when carried out by an adapter CPU according to embodiments.

FIG. 6a illustrates the boot phase 601 for these embodiments, in particular it illustrates the communication of the network processor 322 and the CPU 304 for camera power profile initialization.

When the adapter CPU 304 is powered, it executes all necessary actions during the boot phase 601 in order to be ready for the run time. These actions include the initialization of the peripherals such as the RAM 304, the nvRAM 313 and the communication link 309. During the step 2001 the CPU creates the group object 410 initialized with a group identification read from nvRAM group ID 402. The total group power consumed is initialized to the power consumption of camera in its default power profile. The default power profile is obtained from nvRAM 406 and the power consumed is obtained from NVRAM 408. Next during the step 2004 the CPU sends a "switch to power profile" message 1830 with the field "power profile" 1831 set to the camera default power profile obtained from nvRAM 406. Next during the step 2003, the CPU creates a port object 411 with a port identification read from nvRAM 403 and the same power consumed as the group object. Next during the step 2004 the CPU also creates a camera object set with the camera identification 401, power profile 406 and authorized power profile 407 read from nvRAM. The CPU then links the three objects, first from group to port and then from port to camera. In other words, the CPU sets the group object pointer to point to the port object and then the CPU sets the port object pointer to point to the camera object.

Returning to FIG. 6, during a next step 602, the CPU sends a network join message 501 so that each camera connected to the system includes the power profile of the newly powered camera into the budget calculation. The message is set as follows:

The message field group id 502 is set with the identification of the RAM group object 410,
The message field port id 503 is set with the identification of the RAM port object 411,
The message field camera id 504 is set with the identification of the RAM camera object 412,
The message field power profile 505 is set with the power profile of the RAM camera object 412,
The message field authorized power profile 506 is set with the authorized power profile of the RAM camera object 412, Next, during a step 603, the CPU 304 waits for the reception of a message from remote cameras or from the VMS.

When the CPU receives a change PP message 531, it executes step 604. The change PP message can be sent either by the VMS as part of an operator action in screen 201. It can also be sent by a remote camera as part of a power budget negotiation.

During step 604 the CPU checks if the new power profile would increase the camera power consumption or not (like for example if the camera power profile is "low resolution" and the new power profile is "high resolution").

If the camera power consumption is unchanged or decreased, then, during step 606, the CPU updates the camera power profile with the new value in the camera object 412 in RAM.

Then, concerning embodiments represented in FIG. 3a in which the flowchart is executed by the camera CPU 304, the CPU updates the Total port power consumed in the port object 411 by subtracting from the total the difference of power consumption of the camera according to the old and new power profiles. The CPU then also updates the Total group power consumed in the group object 410 by subtracting from the total the difference of power consumed of the port according to the old and new power consumed.

Concerning embodiments represented in FIG. 3c in which the flowchart is executed by the adapter CPU 304, the CPU sends a "switch to power profile" message 1830 to the camera with the field "power profile" 1831 set to the new power profile. Then, the CPU updates the Total port power consumed in the port object 411 by subtracting from the total the difference of power consumption of the camera according to the old and new power profiles. The CPU then also updates the Total group power consumed in the group object 410 by subtracting from the total the difference of power consumed of the port according to the old and new power consumed.

Then, during a step 607, the CPU returns a CPP acknowledgement message 551 to the sender with the status field 552 set to OK.

During step 608, the CPU sends a PP update broadcast message 511 to advertise all other devices about the camera new power profile. The message is set as follows:

The message field group id 512 is set with the identification of the RAM group object 410,
The message field port id 513 is set with the identification of the RAM port object 411,
The message field camera id 514 is set with the identification of the RAM camera object 412,
The message field power profile 515 is set with the power profile of the RAM camera object 412, Then, the CPU loops back to step 603 for the reception of further other messages.

If the camera power consumption is increased, then, during step 605 the CPU negotiates an increase of the camera power consumption in the system. This step is described in details with reference to FIG. 7. It comprises a new power consumed calculation and if the power consumed would exceed the Receiver or port capacity, then the CPU sends messages to remote cameras in order to instruct them to lower their power profiles. Then, the CPU loops back to step 603 for the reception of other messages.

When the CPU receives a PP update message 511 from a remote camera, then it executes step 609. A PP update message is sent by a remote camera in case the remote camera has changed its power profile upon request from the VMS or upon request of another camera.

Before sending such notification the remote camera checks whether the power capacity of the system will not be exceeded after switching to the new power profile.

During step 609, the CPU compares the group id 512 of the remote camera with the group id of the group object 410. If it matches, then the CPU updates the power profile information in the camera object 412 corresponding to both the remote camera id 514 and port id 513. For this purpose, the power profile info 515 is used.

Next, the CPU updates the port total power consumed and the group total power consumed. The CPU then loops back to step 603 for the reception of other messages.

When the CPU receives a network join message 501 from a newly powered camera, then it executes step 610.

During step 610 the CPU compares the group id 502 of the remote camera with the group id of the group object 410. If it matches, then the CPU creates a new camera object 412 corresponding to both the remote camera id 504 and port id 503. For this purpose, the power profile info 505 is used. Next, the CPU updates the port total power consumed and the group total power consumed. The power budget bounds are not checked at this step and this is left to the newly powered camera.

Next, during step 611, the CPU sends back to the newly powered camera a PP info message 521. The message is set as follows:
  The message field group id 522 is set with the identification of the RAM group object 410,
  The message field port id 523 is set with the identification of the RAM port object 411,
  The message field camera id 524 is set with the identification of the RAM camera object 412,
  The message field power profile 525 is set with the power profile of the RAM camera object 412.

Then, the CPU loops back to step 603 for the reception of other messages.

When the CPU receives a PP info message 521 from a remote camera, it executes step 612. The PP info messages 521 are sent back to the camera as a result of the reception of a network join message 501 sent by the camera when it is powered.

During step 612 the CPU creates a camera object 412 corresponding to the remote camera that sent the PP info message. The camera object is linked to a port object 411 if it already exists. Otherwise, it is linked to a newly created port object 411. A receiver object 410 can also be newly created if needed.

During step 613, the CPU integrates the remote camera power profile into the power consumption calculation. Then, it might take actions in order to modify its own power profile if an overflow is detected. This step is described in details with reference to FIG. 8. Then, the CPU loops back to step 603 for reception of other messages.

When the CPU receives an admin update message 561 from the VMS is executes step 614.

During step 614 the CPU updates the nvRam parameters as follows:
  The message field camera id 562 is written in the nvRAM camera id field 401,
  The message field group id 563 is written in the nvRAM group id field 402,
  The message field port id 564 is written is written in the nvRAM port id field 403,
  The message field group maximum power 565 is written in the nvRAM group maximum power field 404,
  The message field port maximum power 566 is written in the nvRAM port maximum power field 405,
  The message field default power profile 567 is written in the nvRAM default power profile field 406,
  The message field authorized power profile 568 is written in the nvRAM authorized power profile field 407,
  The message field power consumption 569 is written in the nvRAM Power consumption field 408.

Then, the CPU loops back to step 603 for the reception of other messages.

In embodiments represented by FIG. 3b and in some embodiments represented by FIG. 3c, the method of managing power according to the invention, and in particular the flowchart steps represented by FIG. 6 are executed by the network processor 322.

When the network processor 322 is powered, it executes all necessary actions during the boot phase 601 in order to be ready for the run time. These actions include the initialization of the peripherals such as the RAM 326, the nvRAM 321 and the communication link 309.

Figure 6B:
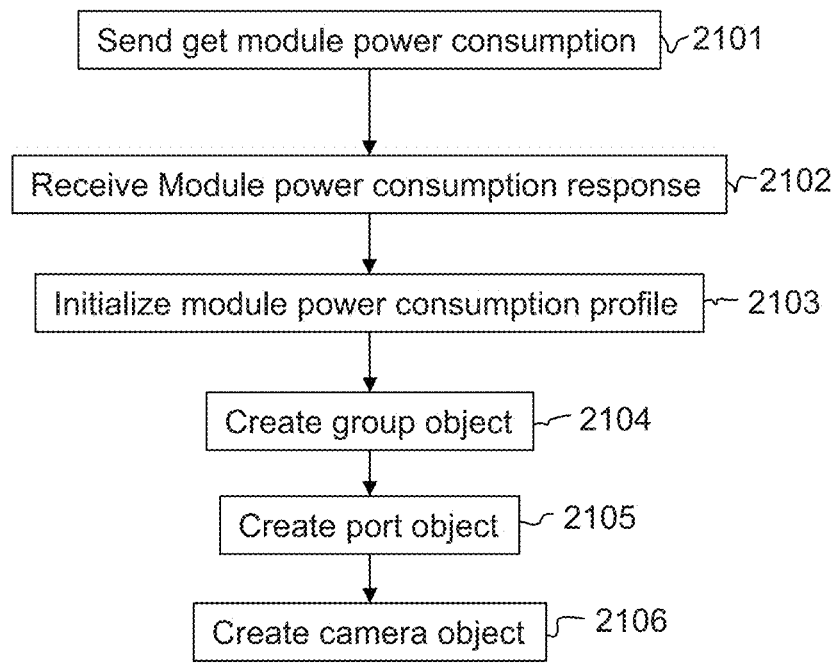
FIG. 6b is a flowchart of additional steps in step 601 of FIG. 6 when carried out by a network processor according to embodiments

FIG. 6b illustrates the communication of the network processor 322 and the CPU 304 for IP over coax adapter power consumption initialization (step 601 of FIG. 6)

During a step 2101 the network processor sends a "get module power consumption" message 1801 to the adapter CPU 304. Then during a step 2102 the network processor receives the "module power consumption response" message 1810 from the CPU.

Next during a step 2103 the Network processor updates the camera consumption information 408 in the Nvram 321. Each field is increased by the corresponding field of the "module power consumption response" message 1810.

During a step 2104 the network processor creates the group object 410 initialized with a group identification read from nvRAM group ID 402. The total group power consumed is initialized to the power consumption of camera in its default power profile. The default power profile is obtained from nvRAM 406 and the power consumed is obtained from NVRAM 408. Next during the step 2104, the network processor creates a port object 411 with a port identification read from nvRAM 403 and the same power consumed as the group object.

Next during the a 2105 the network processor also creates a camera object set with the camera identification 401, power profile 406 and authorized power profile 407 read from nvRAM. The network processor then links the three objects, first from group to port and then from port to camera. In other words, the network processor sets the group object pointer to point to the port object and then the network processor sets the port object pointer to point to the camera object.

Returning to FIG. 6, during a next step 602, the NETWORK PROCESSOR sends a network join message 501 so that each camera connected to the system includes the power profile of the newly powered camera into the budget calculation. The message is set as follows:
  The message field group id 502 is set with the identification of the RAM group object 410,
  The message field port id 503 is set with the identification of the RAM port object 411,
  The message field camera id 504 is set with the identification of the RAM camera object 412,
  The message field power profile 505 is set with the power profile of the RAM camera object 412,
  The message field authorized power profile 506 is set with the authorized power profile of the RAM camera object 412.

Next, during a step 603, the network processor is waits for the reception of a message from remote cameras or from the VMS.

When the network processor receives a change PP message 531, it executes step 604. The change PP message can be sent either by the VMS as part of an operator action in screen 201. It can also be sent by a remote camera as part of a power budget negotiation.

During step 604 the network processor checks if the new power profile would increase the camera power consumption or not (like for example if the camera power profile is "low resolution" and the new power profile is "high resolution").

If the camera power consumption is unchanged or decreased, then, during step 606, the network processor updates the camera power profile with the new value in the camera object 412 in RAM.

Then, the network processor updates the Total port power consumed in the port object 411 by subtracting from the total the difference of power consumption of the camera according to the old and new power profiles. The network processor then also updates the Total group power consumed in the group object 410 by subtracting from the total the difference of power consumed of the port according to the old and new power consumed.

Then, during a step 607, the network processor returns a CPP acknowledgement message 551 to the sender with the status field 552 set to OK.

During step 608, the network processor sends a PP update broadcast message 511 to advertise all other devices about the camera new power profile. The message is set as follows:
  The message field group id 512 is set with the identification of the RAM group object 410,
  The message field port id 513 is set with the identification of the RAM port object 411,
  The message field camera id 514 is set with the identification of the RAM camera object 412,
  The message field power profile 515 is set with the power profile of the RAM camera object 412.

Then, the network processor loops back to step 603 for the reception of further other messages.

If the camera power consumption is increased, then, during step 605 the network processor negotiates an increase of the camera power consumption in the system. This step is described in details with reference to FIG. 7. It comprises a new power consumed calculation and if the power consumed would exceed the Receiver or port capacity, then the network processor sends messages to remote cameras in order to instruct them to lower their power profiles. Then, the network processor loops back to step 603 for the reception of other messages.

When the network processor receives a PP update message 511 from a remote camera, then it executes step 609. A PP update message is sent by a remote camera in case the remote camera has changed its power profile upon request from the VMS or upon request of another camera.

Before sending such notification the remote camera checks whether the power capacity of the system will not be exceeded after switching to the new power profile.

During step 609, the network processor compares the group id 512 of the remote camera with the group id of the group object 410. if it matches, then the network processor updates the power profile information in the camera object 412 corresponding to both the remote camera id 514 and port id 513. for this purpose, the power profile info 515 is used.

Next, the network processor updates the port total power consumed and the group total power consumed. The network processor then loops back to step 603 for the reception of other messages.

When the network processor receives a network join message 501 from a newly powered camera, then it executes step 610.

During step 610 the network processor compares the group id 502 of the remote camera with the group id of the group object 410. if it matches, then the network processor creates a new camera object 412 corresponding to both the remote camera id 504 and port id 503. for this purpose, the power profile info 505 is used. Next, the network processor updates the port total power consumed and the group total power consumed. The power budget bounds are not checked at this step and this is left to the newly powered camera.

Next, during step 611, the network processor sends back to the newly powered camera a PP info message 521. The message is set as follows:
  The message field group id 522 is set with the identification of the RAM group object 410,
  The message field port id 523 is set with the identification of the RAM port object 411,
  The message field camera id 524 is set with the identification of the RAM camera object 412,
  The message field power profile 525 is set with the power profile of the RAM camera object 412.

Then, the network processor loops back to step 603 for the reception of other messages.

When the network processor receives a PP info message 521 from a remote camera, it executes step 612. The PP info messages 521 are sent back to the camera as a result of the reception of a network join message 501 sent by the camera when it is powered.

During step 612 the network processor creates a camera object 412 corresponding to the remote camera that sent the PP info message. The camera object is linked to a port object 411 if it already exists. Otherwise, it is linked to a newly created port object 411. A receiver object 410 can also be newly created if needed.

During step 613, the network processor integrates the remote camera power profile into the power consumption calculation. Then, it might take actions in order to modify its own power profile if an overflow is detected. This step is described in details with reference to FIG. 8. Then, the network processor loops back to step 603 for reception of other messages.

When the network processor receives an admin update message 561 from the VMS is executes step 614.

During step 614 the network processor updates the nvRam parameters as follows:
  The message field camera id 562 is written in the nvRAM camera id field 401,
  The message field group id 563 is written in the nvRAM group id field 402,
  The message field port id 564 is written is written in the nvRAM port id field 403,
  The message field group maximum power 565 is written in the nvRAM group maximum power field 404,
  The message field port maximum power 566 is written in the nvRAM port maximum power field 405,
  The message field default power profile 567 is written in the nvRAM default power profile field 406,
  The message field authorized power profile 568 is written in the nvRAM authorized power profile field 407,
  The message field power consumption 569 is written in the nvRAM Power consumption field 408.

Then, the network processor loops back to step 603 for the reception of other messages.

Figure 7:
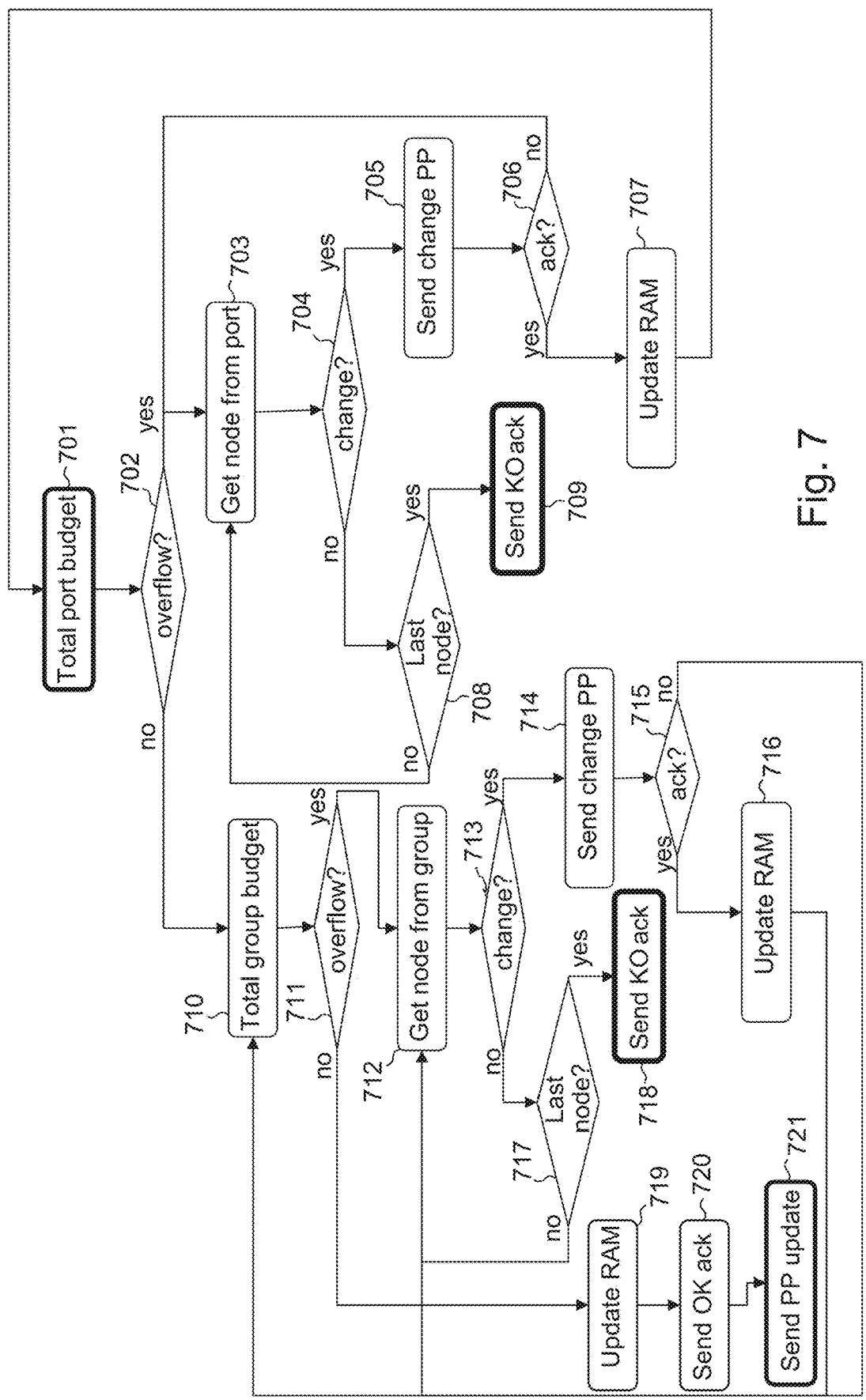
FIG. 7 is a flowchart of steps carried out by a camera CPU for power budget calculation and negotiation with other cameras according to embodiments.

In what follows, power budget calculation and power negotiation with other cameras is described with reference to FIG. 7 which is a flowchart of exemplary steps executed by the camera CPU, the adapter CPU or the network processor depending on the implemented embodiments.

In order to make easier the reading of the description below concerning the flowchart, CPU may mean the camera CPU 304, the adapter CPU 304 or the network processor 322 depending on the implemented embodiment. In a similar manner, camera elements such RAM, nvRAM may be elements of the camera (for embodiments represented by FIGS. 3a, 3b and some embodiments represented by FIG. 3c) or of the adapter (for some embodiments represented by FIG. 3c) depending on the implemented embodiment.

Power budget calculation and power negotiation with other cameras corresponds to step 605 in FIG. 6.

First, during step 701, the CPU (or network processor) calculates the new total power consumed by the receiver port taking into account the new power profile wanted for the camera. For this purpose, it adds the difference of power consumed by the camera according to the current power profile and according to the new power profile to the field "Total port power consumed" of the port object 411.

During test 702, the CPU (or network processor) compares the new calculated port power consumption with the port maximum power capacity 405.

If the port maximum power capacity is exceeded, then, step 703 is executed. During step 703, the CPU gets a camera object 412 of a remote camera from the list of camera objects linked to the port object 411.

Then, during step 704 the CPU (or network processor) gets from the camera object the power profile and the authorized power profiles of the remote camera. The CPU (or network processor) checks whether it is possible to lower the remote camera power profile (the remote camera is not in sleep mode and lower power profiles are allowed).

Two strategies may be implemented. According to a first strategy, the power profile of the cameras is lowered to the minimum until acceptable total power consumption is reached. According to a second strategy, the power profile is changed on an incremental basis per camera in a recurring manner until acceptable total power consumption is reached, for example, the increment is a minimum change of the power profile.

If the remote camera power profile cannot be lowered, then, during step 708, the CPU (or network processor) checks whether this was the last remote camera from the list of remote cameras attached to the receiver port that might have its power profile lowered.

According to the above first strategy, each camera is tested once, whereas according to the second strategy, each camera can be tested several times.

In case there are no more candidate cameras for power profile lowering, then, during step 709 the CPU (or network processor) returns a negative acknowledgement to the sending device (VMS or camera) indicating the impossibility of changing its own power profile because the receiver port power capacity does not allow it (CPP acknowledgement message 551 with status 552 set to KO_PORT). This step ends the power negotiation procedure.

If there remain cameras that might change their power profile, then, the CPU (or network processor) loops back to step 703 to select a new remote camera.

Back to test 704, if the remote camera power profile can be lowered, then, during step 705, the CPU (or network processor) sends a change PP message 531 to the remote camera with the PP field 532 set to the lowest authorized power profile (when the first strategy is implemented) or the next lowest authorized power profile (when the second strategy is implemented).

A third strategy may be implemented wherein the CPU (or network processor) broadcasts the change PP message 531 to all known cameras, thereby avoiding process of selecting the cameras. However, according to this strategy, the power consumption decrease may be more drastic than actually needed if several cameras reduce their consumption simultaneously.

Then, during step 706 the CPU (or network processor) waits for an acknowledgment from the remote camera. If no acknowledgement is received, then the CPU loops back to step 703.

If an acknowledgement is received from the remote camera (CPP acknowledgement 551) with the status 552 OK, then, during step 707, the CPU (or network processor) updates the power profile information of the remote camera in the corresponding camera object 412. Next, the CPU (or network processor) loops back to step 701 to update the total port power consumed.

Back to test 702, if the port maximum power capacity has not been reached, then the CPU (or network processor) calculates, during step 710, the receiver total power consumed by taking into account the camera new requested power profile. For this purpose, it adds the difference of power consumed by the camera according to the current power profile and according to the new power profile to the field "Total group power consumed" of the port object 410.

During test 711, the CPU (or network processor) compares the new calculated receiver power consumed with the receiver maximum power capacity 404.

If the receiver maximum power capacity is exceeded, then step 712 is executed. During step 712 the CPU (or network processor) gets a camera object 412 of a remote camera from the list of camera objects linked to the receiver object 410.

Then, during step 713 the CPU (or network processor) gets from the camera object the power profile and the authorized power profiles of the remote camera. The CPU (or network processor) checks whether it is possible to lower the remote camera power profile (the remote camera is not in sleep mode and lower power profiles are allowed).

Two strategies may be implemented. According to a first strategy, the power profile of the cameras is lowered to the minimum until acceptable total power consumption is reached. According to a second strategy, the power profile is changed on an incremental basis per camera in a recurring manner until acceptable total power consumption is reached, for example, the increment is a minimum change of the power profile.

If the remote camera power budget cannot be lowered, then, during step 717, the CPU (or network processor) checks whether this was the last remote camera, from the list of remote cameras attached to the receiver that might have its power profile lowered.

According to the above first strategy, each camera is tested once, whereas according to the second strategy, each camera can be tested multiple times.

If there are no more candidate cameras power profile lowering, then, during step 718, the CPU (or network processor) returns a negative acknowledgement to the sending device (VMS or camera) indicating the impossibility of changing its own power profile because the receiver power capacity does not allow it (CPP acknowledgement message 551 with status 552 set to KO_RECEIVER). This step ends the power negotiation procedure.

If there remain cameras that might change their power profile, then the CPU loops back to step 712 to select a new remote camera.

Back to test 713, if the remote camera power profile can be lowered, then, during step 714 the CPU (or network processor) sends a change PP message 531 to the remote camera with the PP field 532 set to the lowest authorized power profile (according to the first strategy) or the next lowest authorized power profile (according to the second strategy).

According to a third strategy, the CPU (or network processor) may broadcast the change PP message 531 to all known cameras, thereby saving the process of selecting the cameras. However, according to this strategy, the power consumption decrease may be more drastic than actually needed if several cameras reduce their consumption simultaneously.

Then, during step 715 the CPU waits for an acknowledgment from the remote camera. If no acknowledgement is received, then the CPU loops back to step 712.

If an acknowledgement is received from the remote camera (CPP acknowledgement 551) with the status 552 OK then, during step 716, the CPU (or network processor) updates the power profile information of the remote camera in the corresponding camera object 412. Then, the CPU (or network processor) loops back to step 710 in order to update the total receiver power consumption.

Back to test 711, if the newly calculated total receiver power consumed is not exceeding the receiver maximum power capacity, then:

concerning the camera embodiments represented by FIGS. 3a, 3b and those represented by FIG. 3c in which steps flowchart are executed by the camera CPU 304, the camera CPU (or network processor) updates, during step 719, the camera power profile in the camera object 412, and concerning the camera embodiments represented by FIG. 3c in which steps flowchart are executed by the adapter CPU 304, the adapter CPU updates, during step 719, the camera power profile in the camera object 412. Then the adapter CPU sends a "switch to power profile" message 1830 to the camera with the field "power profile" 1831 set to the new power profile.

Next, the CPU (or network processor) sends a positive acknowledgement message to the requesting device (VMS or camera). It sends a CPP acknowledgement message 551 with the status field 552 set to OK.

During step 721 the CPU (or network processor) then broadcasts a PP update message 511 set as follows:

The message field group id 512 is set with the identification of the RAM group object 410, The message field port id 513 is set with the identification of the RAM port object 411 to which the camera is plugged, The message field camera id 514 is set with the identification of the RAM camera object 412, The message field power profile 515 is set with the power profile of the RAM camera object 412.

This step ends the power negotiation procedure.

Figure 8:
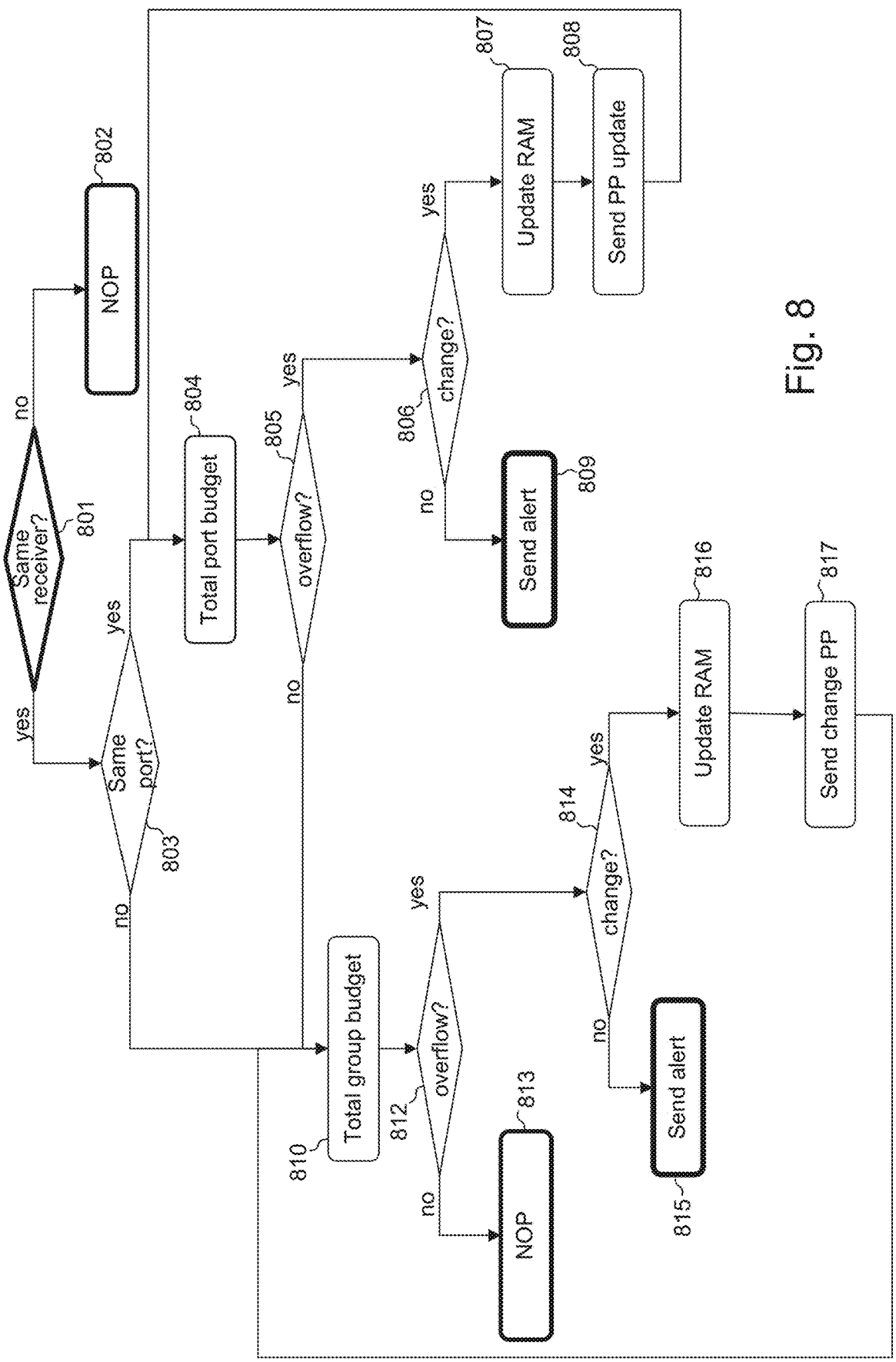
FIG. 8 is a flowchart of steps carried out by a camera CPU for power budget checking upon receipt of a PP info Message according to embodiments.

In what follows, the power budget checking performed by the camera CPU the adapter CPU or the network processor (depending on the implemented embodiment) when it receives a PP info Message is described with reference to the flowchart of exemplary steps of FIG. 8. This process corresponds to step 613 of FIG. 6.

In order to make easier the reading of the description below concerning the flowchart, CPU may mean the camera CPU 304, the adapter CPU 304 or the network processor 322 depending on the implemented embodiment. In a similar manner, camera elements such RAM, nvRAM may be elements of the camera (for embodiments represented by FIGS. 3a, 3b and some embodiments represented by FIG. 3c) or of the adapter (for some embodiments represented by FIG. 3c) depending on the implemented embodiment.

First, during step 801, the CPU (or network processor) checks whether the remote camera is plugged to the same receiver. The CPU (or network processor) compares the group id field 522 of the PP info message 521 with the camera group id 402.

If the remote camera is not plugged to the same receiver as the CPU, then there is nothing to be checked by the CPU (or network processor). The process goes to a "no operation" state (step 802), which, by convention, represents the end of the process.

If the remote camera is plugged to the same receiver as the CPU (or network processor), then, during step 801, the CPU (or network processor) checks whether the remote camera is plugged to the same receiver port as the CPU (or network processor). The CPU (or network processor) compares the port id field 523 of the PP info message 521 with the camera port id 403.

If the remote camera is plugged to the same receiver port as the CPU (or network processor), then, during step 804, the CPU (or network processor) calculates the power consumption of the receiver port, taking into account the power profile of the new camera. For this purpose, it adds the difference of power consumed by the camera in the current power profile and in the new power profile to the field "Total port power consumed" of the port object 411.

During test 805, the CPU (or network processor) compares the new calculated port power consumption with the port maximum power capacity 405.

If the port maximum power capacity is exceeded, then step 806 is executed. During step 806, the CPU (or network processor) checks whether it is possible to lower its own power profile (the power profile is not already set to sleep mode and lower power profiles are allowed).

If the CPU's (or network processor's) own power profile cannot be lowered, then, during step 809, the CPU (or network processor) sends an alert message 571 to the VMS indicating that the receiver port will not be able to provide enough power for all cameras (Alert message 571 with Group id 572 set to Group id 402, Port id 573 set to port id 403, Camera id 574 set to camera id 401 and status 575 set to PORT). This step 809 ends the power budget checking procedure.

Back to test 806, if the CPU (or network processor) own power profile can be lowered, then during step 807, the CPU (or network processor) updates its own power profile in the camera object 412.

In case of a camera embodiment in which the method of managing power is executed in the adapter (FIG. 3c), during step 807, after the CPU has been updated its own power profile in the camera object 412, the CPU sends a "switch to power profile" message 1830 to the camera with the field "power profile" 1831 set to the new power profile.

Then, during step 808 the CPU (or network processor) broadcasts a PP update message 531 to all cameras in order to inform about its new power profile. The Group id field 572 is set to Group id 402, the Port id field 573 is set to port id 403, the Camera id field 574 is set to camera id 401 and the PP field 515 is set to the new camera power profile. Next, the CPU (or network processor) loops back to step 804 to check again the power budget.

Back to test 805, if the port maximum power capacity has not been reached, then the CPU (or network processor) calculates during step 810 the receiver total power consumed by taking into account the remote camera power profile. For this purpose, it adds the difference of power consumed by the camera according to the current power profile and according to the new power profile to the field "Total group power consumed" of the port object 410.

During test 812 the CPU (or network processor) compares the new calculated receiver power consumption with the receiver maximum power capacity 404

If the receiver maximum power capacity is exceeded, then step 814 is executed. During step 814 the CPU (or network processor) checks whether it is possible to lower its own power profile (the camera is not in sleep mode and lower power profiles are allowed).

If the CPU (or network processor) own power profile cannot be lowered, then, during step 815, the CPU (or network processor) sends an alert message 571 to the VMS indicating that the receiver will not be able to provide enough power for all cameras (Alert message 571 with Group id 572 set to Group id 402, Port id 573 set to port id 403, Camera id 574 set to camera id 401 and status 575 set to RECEIVER). This step ends the power budget checking procedure.

Back to test 814, if the CPU (or network processor) own power profile can be lowered, then during step 816, the CPU (or network processor) updates its own power profile in the camera object 412.

In case of a camera embodiment in which the method of managing power is executed in the adapter (FIG. 3c), during step 816, after the adapter CPU has been updated its own power profile in the camera object 412, the adapter CPU sends a "switch to power profile" message 1830 to the camera with the field "power profile" 1831 set to the new power profile.

Next, during step 817, the CPU (or network processor) broadcasts a PP update message 531 to all cameras to inform about its new power profile. The Group id field 572 is set to Group id 402, the Port id field 573 is set to port id 403, the Camera id field 574 is set to camera id 401 and the PP field 515 is set to the new camera power profile. Then the CPU (or network processor) loops back to the step 810 to check again the power budget.

Back to test 812, if the newly calculated total receiver power consumption is not exceeding the receiver maximum power capacity, then the CPU (or network processor) has no action perform. The process goes to a "no operation" state (step 813) which represents the end of the process.

An exemplary process performed by the CPU of the VMS 101 is described hereinafter with reference to FIG. 9.

In an initial step 901 the CPU of the VMS waits for a GUI (acronym for Graphical User Interface) action from the user.

If the user modified the GUI panel 200 corresponding to the "admin configuration" screen, then, during step 906 the CPU sends an "admin update" message 561 with all fields set according to the user's entries in the screen 200. Next, the CPU loops back to the initial step 901.

If the user acts on the GUI panel 201 part corresponding the camera control screen, then during step 902 the CPU sends a change power profile message 531 to the camera that the user has designated. Each field of the change PP message 531 is set with the values that the user entered in the GUI.

Next, the CPU waits for the camera acknowledgement (CPP acknowledgement 551) during step 903.

When the acknowledgement is received, the CPU checks during test 904 the status field 552.

If the status field is "OK", the VMS CPU loops back to the initial step 901.

If the status is not "OK", then, during step 905, the VMS CPU displays an error screen 202 if the status is "KO PORT" or an error screen 203 if the status is "KO RECEIVER".

Next, the VMS CPU loops back to the initial step 901.

If there is no GUI action, then the CPU checks during test 907 whether an alert message has been received.

If no alert message is received, then the CPU loops back to the initial step 901.

If an alert message is received, then the CPU displays a system error message 204 if the status 571 is "PORT" or a system error message 203 if the status 571 is "RECEIVER".

Next, the VMS CPU loops back to the initial step 901.

Figure 10:
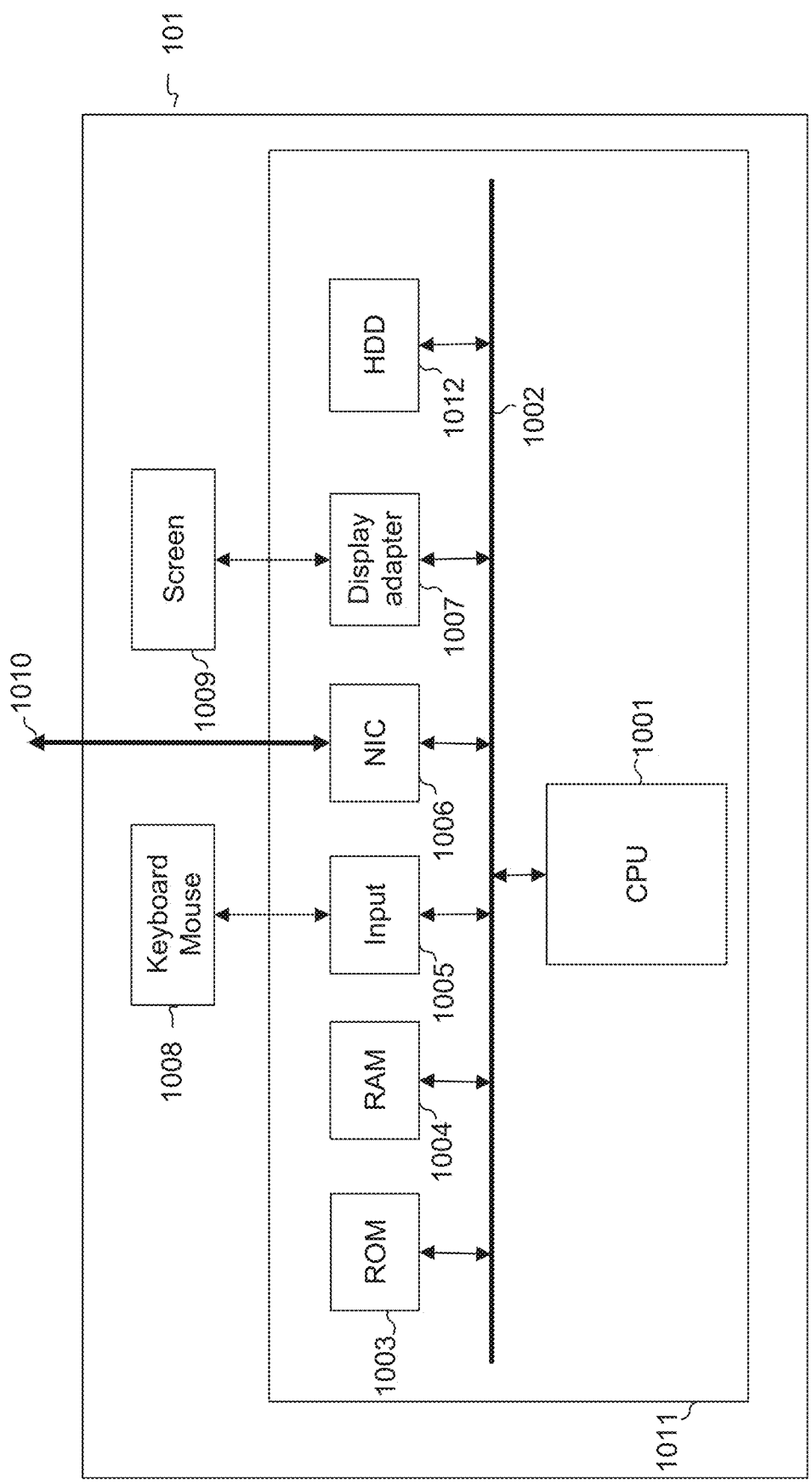

An exemplary architecture for the VMS 101 is described with reference to FIG. 10.

The VMS comprises a processing unit 1011 connected to I/O devices 1008 including for example a mouse and/or a keyboard to allow the operator to act on the GUI which is displayed on a display device 1009.

The processing unit 1011 comprises a CPU 1001 connected to peripheral controllers through a communication bus 1002.

Figure 9:
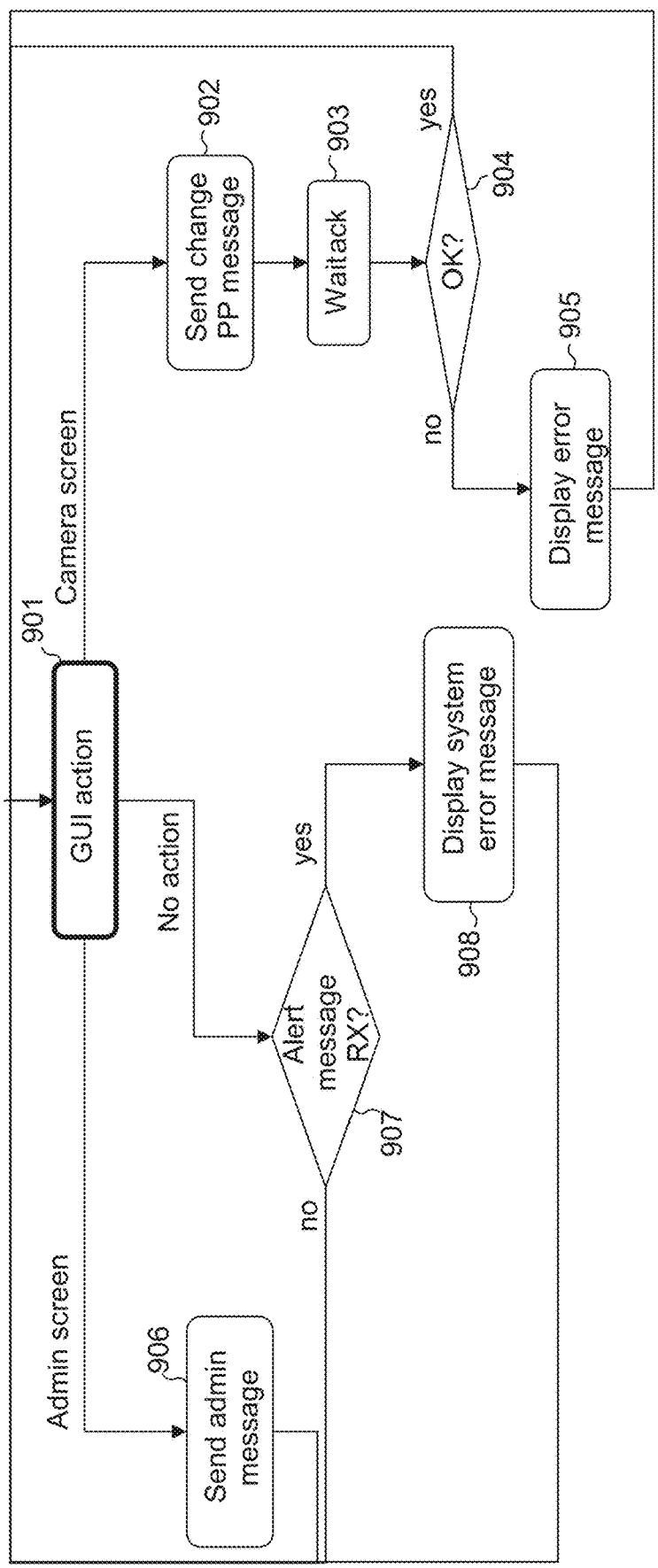
FIG. 9 is a flowchart of steps carried out by a VMS CPU according to embodiments, FIG. 10 schematically illustrates a VMS according to embodiments, FIG. 11 schematically illustrates data processed by a VMS CPU according to embodiments.

The ROM peripheral 1003 is used for storing the CPU programs which may be designed according to the methods according to embodiments as presently described, for example with reference to FIG. 9.

When the VMS is started up, the programs are copied from the ROM to the RAM 1004. The CPU gets its instructions and data from the RAM 1004.

The Input peripheral controller 1005 manages the mouse and keyboard. The input peripheral drives the mouse and keyboard by implementing for example USB or PS2 or any other known computer I/O management standard.

The Network Interface Card (NIC) controller 1006 connects the CPU to the network. In this example it is an Ethernet controller and the cable 1010 is an Ethernet cable.

The display adapter 1007 drives the display device 1009 by implementing for example HDMI or DVI or any other known computer graphics standard.

The hard drive 1012 is used for storing permanent data.

In what follows, embodiments are described wherein the power budget calculation may be performed by the cameras and the power negotiation by the VMS.

Figure 11:
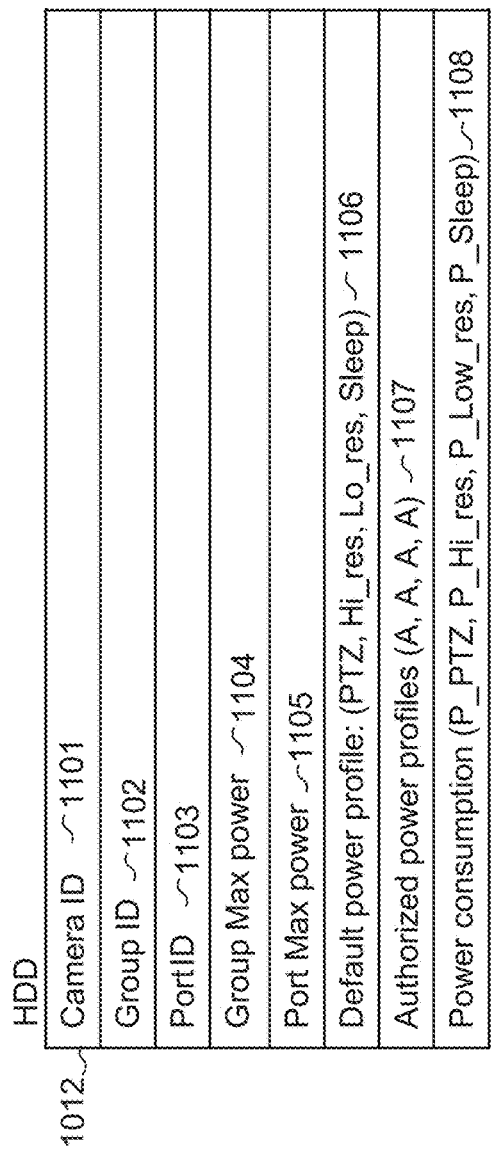
Figure 11:
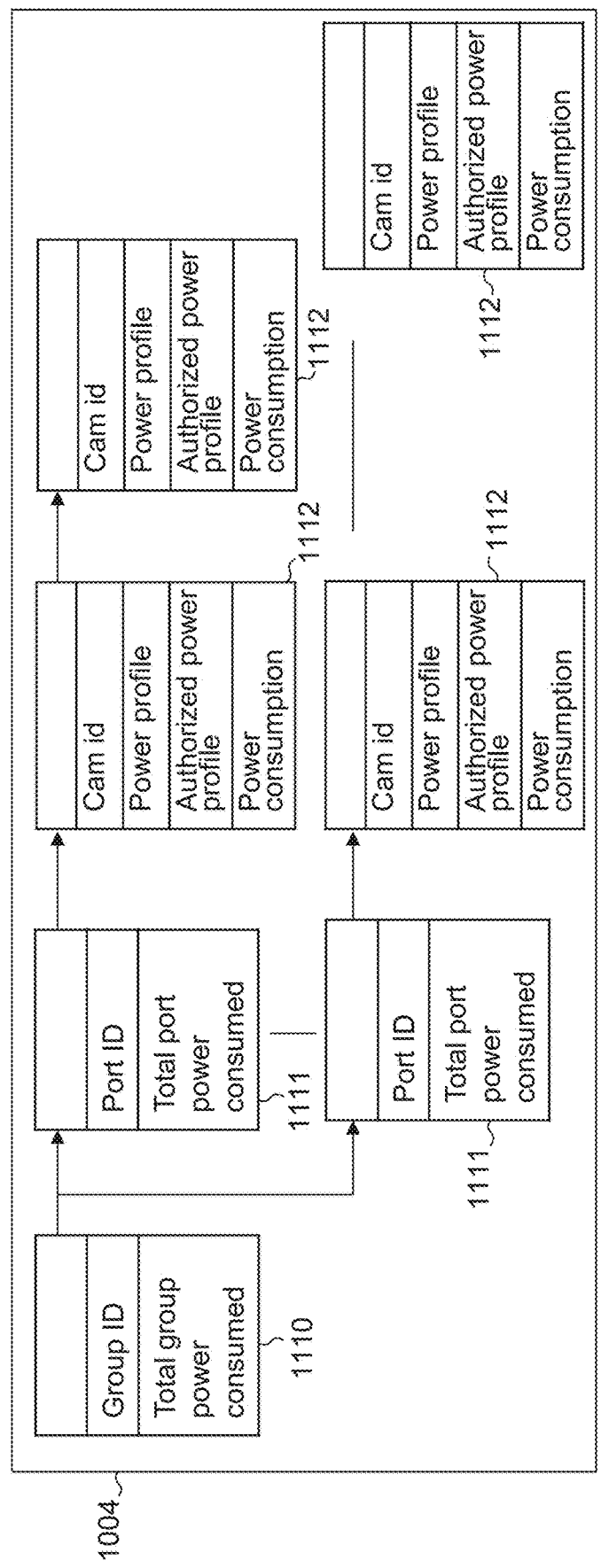

The data processed by the CPU 1001 of the VMS according to such embodiments are described with reference to FIG. 11.

The power parameters are stored in the hard drive 1012. These parameters are set at VMS installation time (system setup). They can be overwritten by the operator during operation when the administrator changes the values as a result of device change.

The hard drive parameters include for each camera in the system:

Camera ID (1101): an identification of the camera
  Group ID (1102): an identification of the Receiver that provides the power to the Camera (with the examples of FIGS. 1a and 1b the cameras 108, 109 and 110 shall be configured with group id set to Recevier1 while the cameras 113, 112 and 111 have a group id set to Recevier2).
  Port ID (1103): an identification of the Receiver port that provides the power to the camera (with the examples of FIGS. 1a and 1b the cameras 108 and 109 have a port id set to 2, the camera 110 have port id set to 4 and the cameras 113, 112 and 111 have a port id set to 3).
  Group max power (1104): reflects the maximum power that can be delivered by the Receiver that provides the power to the camera (IN Figure (with the examples of FIGS. 1a and 1b all cameras shall have the group max power set to 250 watt).

Port max power (1105): reflects the maximum power that can be delivered by the port of the Receiver that provides the power to the camera (with the examples of FIGS. 1a and 1b all cameras shall have the group max power set to 75 watt).

Default power profile (1106): defines the power profile of the camera after a cycle power on. Four possible profiles are described as an illustration of the invention:
  PTZ: the camera movements are allowed including the optical zoom setup,
  Hi_res: the camera can be set to the highest image resolution, camera movements are not allowed,
  Lo_res: the camera cannot be set to high resolution and the camera movements are not allowed,
  Sleep: the mare is not allowed to stream video and the camera movement are not allowed.

Authorized power profiles (1107): defines the power profile that the administrator wants to authorise for the camera. For example, if an administrator wants that the camera is never in sleep mode and it doesn't care about the resolution and the ability to move, then the administrator will set (1,1,1,0) as the authorized power profiles.

Power consumption (1108): defines the camera power consumption in the different profiles:
  P_PTZ: power consumed by the camera when in PTZ profile,
  P_HI_res: power consumed by the camera when in Hi_res profile,
  P_Lo_res: power consumed by the camera when in Lo_res profile,
  P_Sleep: power consumed by the camera when in Sleep profile.

During runtime the CPU 1001 of the VMS processes the available power budget and its own power profile by maintaining a data structure in the RAM 1004. This data structure comprises one Group object for each Receiver in the system, each group object contains:
  The group ID as set in the Group ID 1102,
  The total group power consumed: the sum of the power profiles of all the camera connected to the Receiver,
  Pointer to port objects: each port of the Receiver is represented by a port object 1111.

The port object 1111 contains:
The port ID as set in the Port ID 1103,
The total port power consumed: the sum of the power profiles of all the camera connected to the Receiver port,
Pointer to camera object: each camera is represented by a camera object 1112.

The camera object 1112 contains:
The camera ID: local identification as set in the Camera ID 1101 or the identification of the other cameras as the CPU is receiving Network join messages 501 or PP info message 521.
The Power profile: as set in the Default Power Profile 1106, or as modified by the VMS (Change PP message 531) for a local camera or as set in Network join messages 501 or PP info message 521 from other camera,
Authorized power profile: as set in the Authorized power profiles 1107 or as modified by the VMS (Change APP message 551) for a local camera, or as set in Network join messages 501 from other cameras,
Power consumption information as set in the Power Consumption 1108.

Figure 12:
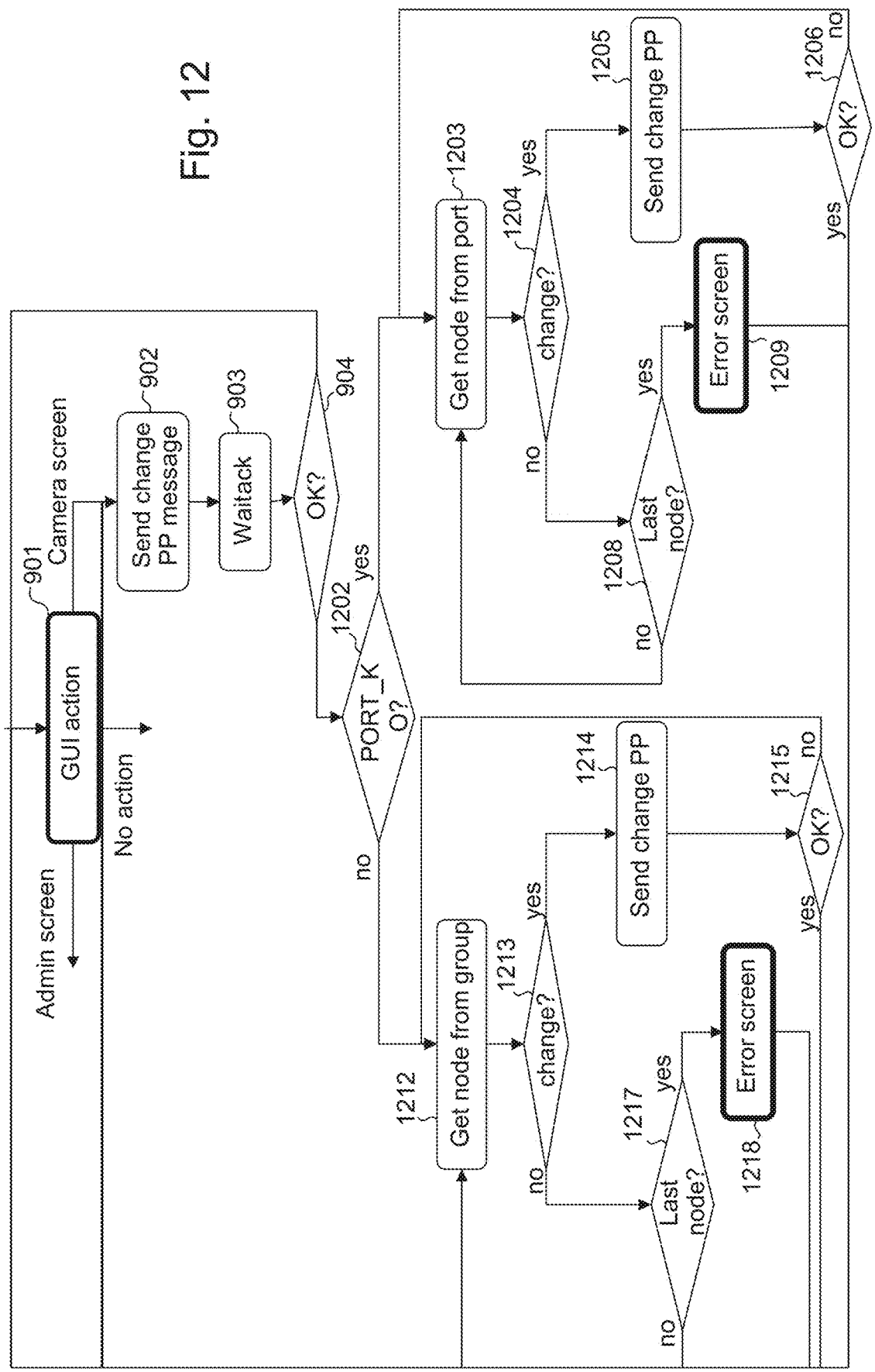
FIG. 12 is a flowchart of steps carried out by a VMS CPU for power negotiation according to embodiments.

The power negotiation by the VMS is described with reference to the flowchart of FIG. 12. Some steps of the flowchart of FIG. 12 are the same as those of the flowchart of FIG. 9, the references used in FIG. 12 are thus the same as in FIG. 9 for these common steps.

In an initial step 901, the CPU of the VMS waits for a GUI action from the user.

If the user acts on the GUI panel 200 part corresponding to the administration configuration, then the steps and actions executed by the CPU are those described with reference to FIG. 9.

If the user does not act on the GUI actions, then the steps and actions executed by the VMs CPU are described with reference to FIG. 9.

If the user acts on the GUI panel 201 part corresponding to the camera control, then during step 902, the CPU of the VMS sends a change power profile message 531 to the camera that the user has designated. Each field of the change PP message 531 is set with the values entered by the user in the GUI.

Next, the CPU waits for the camera acknowledgement (CPP acknowledgement 551) during step 903.

When the acknowledgement is received, the CPU checks during test 904 the status field 552.

If the status field is "OK", the CPU loops back to the initial step 901.

If the status is not "OK", then, during test 1202, the CPU checks whether the status is "PORT_KO" (port power capacity is exceeded).

If the port maximum power capacity is exceeded, then, step 1203 is executed. During step 1203, the CPU gets a camera object 1112 of a second camera from the list of camera objects linked to the same port object 1111 as the camera selected by the operator during the previous step 901.

Alternatively, during step 1203, the CPU can ask the operator to select a candidate camera for power profile reduction.

Next, during step 1204, the CPU gets from the camera object the power profile and the authorized power profiles of the second camera. The CPU checks whether it is possible to lower the second camera power profile (the remote camera is not in sleep mode and lower power profiles are allowed).

According to a first strategy, the power profile of the cameras is lowered to the minimum until acceptable total power consumption is reached. According to a second strategy, the power profile is changed on an incremental basis per camera in a recurring manner until acceptable total power consumption is reached, for example, the increment is a minimum change of the power profile.

If the second camera power profile cannot be lowered, then, during step 1208, the CPU checks whether this was the last remote camera from the list of remote cameras attached to the receiver port that might have its power profile lowered.

According to the first strategy, each camera is tested once, whereas for the second strategy, each camera can be tested several times.

If there are no more candidate cameras for power profile lowering, then, during step 1209, the CPU displays an error message 202 indicating the impossibility of changing the power profile of the camera because the receiver port power capacity does not allow it. This step ends the power negotiation procedure. The CPU then loops back the initial step 901.

If there remain cameras that might change their power profile, then the CPU loops back to step 1203 to select a new camera.

Back to test 1204, if the remote camera power profile can be lowered, then, during step 1205, the CPU sends a change PP message 531 to the second camera with the PP field 532 set to the lowest authorized power profile (for the first strategy) or the next lowest authorized power profile (for the second strategy).

According to a third strategy, the CPU may broadcast the change PP message 531 to all known cameras, thereby saving the process of selecting the cameras. However, according to this strategy, the power consumption decrease may be more drastic than actually needed.

Next, during step 1206 the CPU waits for an acknowledgment from the remote camera. If no acknowledgement is received, then, the CPU loops back to step 1203.

If an acknowledgement is received from the second camera (CPP acknowledgement 551) with the status 552 OK, then, the CPU updates the power profile information of the remote camera in the corresponding camera object 1112. The CPU loops back to step 902 in order to send again the change PP message to the camera selected by the operator during the previous step 901.

Back to test 1202, if the receiver maximum power capacity is exceeded, then step 1212 is executed. During step 1212, the CPU gets a camera object 1112 of a second camera from the list of camera objects linked to the same receiver object 1110 as the camera selected by the operator during the previous step 901.

Alternatively, during step 1212, the CPU may ask the operator to select a candidate camera for power profile reduction.

Next, during step 1213, the CPU gets from the camera object the power profile and the authorized power profiles of the second camera. The CPU checks whether it is possible to lower the second camera power profile (the second camera is not in sleep mode and lower power profiles are allowed).

According to a first strategy, the power profile of the cameras is lowered to the minimum until acceptable total power consumption is reached. According to a second strategy, the power profile is changed on an incremental basis per camera in a recurring manner until acceptable total power consumption is reached, for example, the increment is a minimum change of the power profile.

If the second camera power budget cannot be lowered, then, during step 1217, the CPU checks whether this was the last camera from the list of cameras attached to the receiver that might have its power profile lowered According to the first strategy, each camera is tested once, whereas according to the second strategy, each camera may be tested several times.

If there are no more candidate cameras for power profile lowering, then, during step 1218, the CPU displays an error message 203 indicating the impossibility of changing the power profile of the camera because the receiver power capacity does not make it possible. This step ends the power negotiation procedure. The CPU then loops back to the initial step 901.

If there remain cameras that might change their power profile, then the CPU loops back to step 1212 to select a new remote camera.

Back to test 1213, if the second camera power profile can be lowered, then, during step 1214, the CPU sends a change PP message 531 to the second camera with the PP field 532 set to the lowest authorized power profile (according to the first strategy) or the next lowest authorized power profile (according to the second strategy).

According to a third strategy, the CPU may broadcast the change PP message 531 to all known cameras thereby saving the process of selecting the cameras. However, according to this strategy, the power consumption decrease may be more drastic than actually needed.

Next, during step 1215, the CPU waits for an acknowledgment from the remote camera. If no acknowledgement is received, then the CPU loops back to step 1212.

If an acknowledgement is received from the remote camera (CPP acknowledgement 551) with the status 552 OK, then, during step 1216, the CPU updates the power profile information of the remote camera in the corresponding camera object 1112. Next, the CPU loops back to step 1210 in order to update the total receiver power consumption.

If an acknowledgement is received from the second camera (CPP acknowledgement 551) with the status 552 OK, then, the CPU updates the power profile information of the remote camera in the corresponding camera object 1112. The CPU loops back to the step 902 to send again the change PP massage to the camera selected by the operator during the previous step 901.

Figure 13:
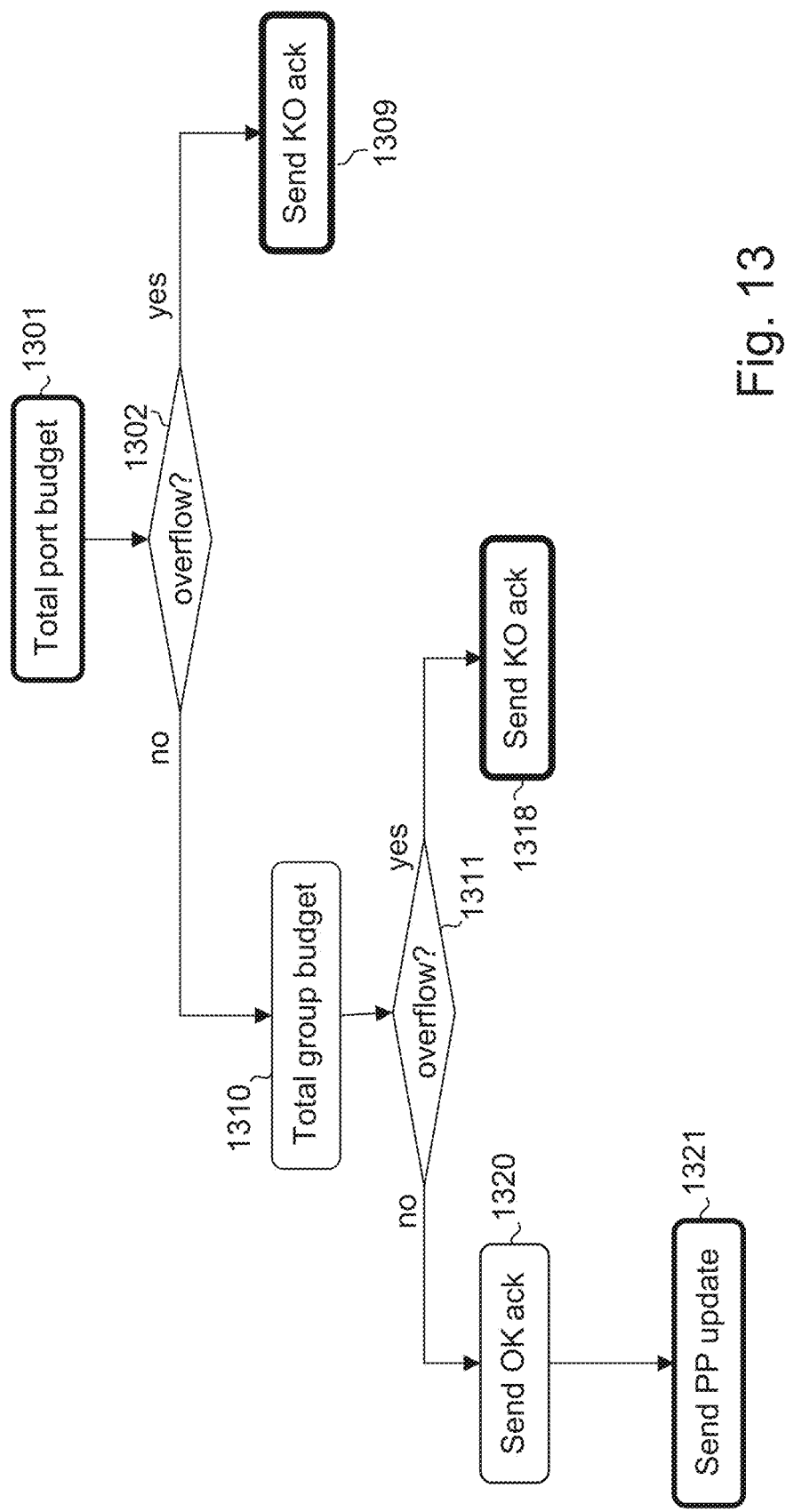
FIG. 13 is a flowchart of steps carried out by a camera CPU for power budget calculation according to embodiments.

An exemplary power budget calculation by the CPU of a camera or of an adapter, or by a network processor (depending in the implemented embodiment) is described in what follows with reference to the flowchart of FIG. 13. This calculation is an implementation of step 605 in FIG. 6.

First, during step 1301, the CPU calculates the new total power consumed by the receiver port, taking into account the new power profile wanted for the camera. For this purpose, it adds the difference of power consumed by the camera according to the current power profile and according to the new power profile to the field "Total port power consumed" of the port object 411.

During test 1302, the CPU compares the new calculated port power consumption with the port maximum power capacity 405.

If the port maximum power capacity is exceeded, then, during step 1309, the CPU returns a negative acknowledgement to the sending device (VMS or camera) indicating the impossibility of changing its own power profile because the receiver port power capacity does not allow it (CPP acknowledgement message 551 with status 552 set to KO_PORT). This step ends the power negotiation procedure.

Back to test 1302, if the port maximum power capacity has not been reached, then, the CPU calculates during step 1310 the receiver total power consumed by taking into account the camera new requested power profile. For this purpose it adds the difference of power consumed by the camera according to the current power profile and according to the new power profile to the field "Total group power consumed" of the port object 410.

During test 1311, the CPU compares the new calculated receiver power consumed with the receiver maximum power capacity 404.

If the receiver maximum power capacity is exceeded, then, during step 1318, the CPU returns a negative acknowledgement to the sending device (VMS or camera) indicating the impossibility of changing its own power profile because the receiver power capacity does not allow it (CPP acknowledgement message 551 with status 552 set to KO_RE-CEIVER). This step ends the power negotiation procedure.

Back to test 1311, if the newly calculated total receiver power consumed is not exceeding the receiver maximum power capacity, then the CPU updates, during step 1319, the camera power profile in the camera object 412.

Next, the CPU sends a positive acknowledgement message during step 1320, to the requesting device (VMS or camera). It sends a CPP acknowledgement message 551 with the status field 552 set to OK.

Next, during step 1321, the CPU broadcasts a PP update message 511 set as follows:

The message field group id 512 is set with the identification of the RAM group object 410, The message field port id 513 is set with the identification of the RAM port object 411 to which the camera is plugged, The message field camera id 514 is set with the identification of the RAM camera object 412, The message field power profile 515 is set with the power profile of the RAM camera object 412.

This step ends the power negotiation procedure.

Figure 14:
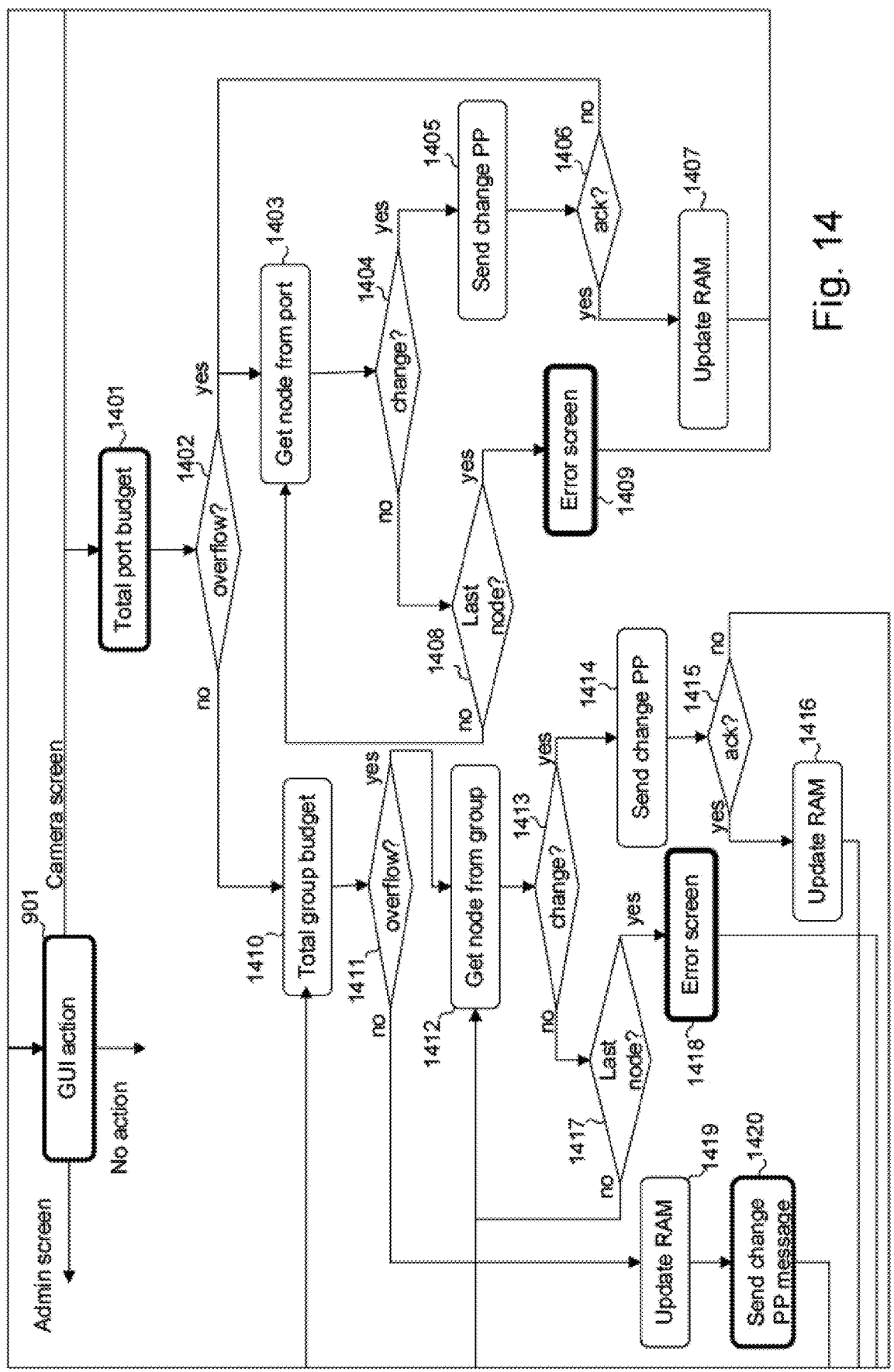
FIG. 14 is a flowchart of steps carried out by a VMS CPU for power budget calculation and for power negotiation according to embodiments.

In what follows, embodiments are described wherein the power budget calculation and the power negotiation are performed by the VMS. Such embodiments are described with reference to the flowchart of FIG. 14.

The initial step 901 is the same as in FIG. 9, the CPU waits for a GUI action from the user.

If the user acts on the part of the GUI panel 200 that corresponds to the "admin configuration" screen, then the steps and actions executed by the CPU are those described with reference to FIG. 9.

If there was no GUI action, then the steps and actions executed by the CPU are also those described with reference to FIG. 9.

If the user acts on the part of the GUI panel 201 that corresponds to the camera control screen, then, during step 1401, the CPU calculates the new total power consumed by the receiver port taking into account the new power profile wanted for the selected camera. For this purpose, it adds the difference of power consumed by the camera according to the current power profile and according to the new power profile to the field "Total port power consumed" of the port object 1111.

During test 1402, the CPU compares the new calculated port power consumption with the port maximum power capacity 1105.

If the port maximum power capacity is exceeded, then step 1403 is executed. During step 1403, the CPU gets a camera object 1112 of a second camera from the list of camera objects linked to the same port object 1111 as the camera selected by the operator during the previous step 901.

Alternatively, during step 1403, the CPU may ask the operator to select a candidate camera for power profile reduction.

Next, during step 1404, the CPU gets from the camera object the power profile and the authorized power profiles of the second camera. The CPU checks whether it is possible to lower the second camera power profile (the remote camera is not in sleep mode and lower power profiles are allowed). Two strategies can be implemented with regards to the invention.

According to a first strategy, the power profile of the cameras is lowered to the minimum until acceptable total power consumption is reached. According to a second strategy, the power profile is changed on an incremental basis per camera in a recurring manner until acceptable total power consumption is reached, for example, the increment is a minimum change of the power profile.

If the second camera power profile cannot be lowered, then, during step 1408, the CPU checks whether this was the last remote camera from the list of remote cameras attached to the receiver port that might have its power profile lowered. According to the first strategy, each camera is tested once, whereas for the second strategy, each camera can be tested several times.

If there are no more candidate cameras for power profile lowering, then, during step 1409, the CPU displays an error message 202 indicating the impossibility of changing the power profile of the camera because the receiver port power capacity does not allow it. This step ends the power negotiation procedure. Next, the CPU loops back the initial step 901.

If there remain cameras that might change their power profile, then the CPU loops back to step 1403 to select a new second camera.

Back to test 1404, if the remote camera power profile can be lowered, then, during step 1405, the CPU sends a change PP message 531 to the second camera with the PP field 532 set to the lowest authorized power profile (for the first strategy) or the next lowest authorized power profile (for the second strategy).

According to a third strategy, the CPU may broadcast the change PP message 531 to all known cameras, thereby saving the process of selecting the cameras. However, according to this strategy, the power consumption decrease may be more drastic than actually needed.

Next, during step 1406, the CPU waits for an acknowledgment from the second camera. If no acknowledgement is received, then the CPU loops back to step 1403.

If an acknowledgement is received from the second camera (CPP acknowledgement 551) with the status 552 OK, then during step 1407 the CPU updates the power profile information of the second camera in the corresponding camera object 1112. Next, the CPU loops back to step 1401 in order to update the total port power consumed.

Back to test 1402, if the port maximum power capacity has not been reached, then the CPU calculates during step 1410 the receiver total power consumed by taking into account the camera new requested power profile. For this purpose, it adds the difference of power consumed by the camera according to the current power profile and according to the new power profile to the field "Total group power consumed" of the port object 1110.

During test 1411, the CPU compares the new calculated receiver power consumed with the receiver maximum power capacity 1104.

If the receiver maximum power capacity is exceeded, then the step 1412 is executed. During step 1412 the CPU gets a camera object 1112 of a second camera from the list of camera objects linked to the same receiver object 1110 as the camera selected by the operator during the previous step 901.

Alternatively, during step 1212 the CPU may prompt the operator to select a candidate camera for power profile reduction.

Next, during step 1413 the CPU gets from the camera object the power profile and the authorized power profiles of the second camera. The CPU checks whether it is possible to lower the second camera power profile (the second camera is not in sleep mode and lower power profiles are allowed).

According to a first strategy, the power profile of the cameras is lowered to the minimum until acceptable total power consumption is reached. According to a second strategy, the power profile is changed on an incremental basis per camera in a recurring manner until acceptable total power consumption is reached, for example, the increment is a minimum change of the power profile.

If the second camera power budget cannot be lowered, then during step 1417 the CPU checks whether this was the last second camera from the list of second cameras attached to the receiver that might have its power profile lowered. According to the first strategy, each camera is tested once, whereas for the second strategy, each camera can be tested several times.

If there are no more candidate cameras for power profile lowering, then during step 1418, the CPU returns a negative acknowledgement to the sending device (VMS or camera) indicating the impossibility of changing its own power profile because the receiver power capacity does not allow it (CPP acknowledgement message 551 with status 552 set to KO_RECEIVER). This step ends the power negotiation procedure.

If there are no more candidate cameras for power profile lowering, then, during step 1218, the CPU displays an error message 203 indicating the impossibility of changing the power profile of the camera because the receiver power capacity does not allow it. This step ends the power negotiation procedure. The CPU loops back the initial step 901.

If there remain cameras that might change their power profile, then, the CPU loops back to step 1412 to select a new second camera.

Back to test 1413, if the second camera power profile can be lowered, then during step 1414 the CPU sends a change PP message 531 to the second camera with the PP field 532 set to the lowest authorized power profile (for the first strategy) or the next lowest authorized power profile (for the second strategy).

According to a third strategy, the CPU may broadcast the change PP message 531 to all known cameras, thereby saving the process of selecting the cameras. However, according to this strategy, the power consumption decrease may be more drastic than actually needed.

Next, during step 1415 the CPU waits for an acknowledgment from the second camera. If no acknowledgement is received, then the CPU loops back to step 1412.

If an acknowledgement is received from the second camera (CPP acknowledgement 551) with the status 552 OK then during the step 1416 the CPU updates the power profile information of the second camera in the corresponding camera object 1112. Then the CPU loops back to step 1410 in order to update the total receiver power consumption.

Back to test 1411, if the newly calculated total receiver power consumed is not exceeding the receiver maximum power capacity, then, the CPU updates during step 1419 the camera power profile in the camera object 1112.

Next, during step 1420 the CPU of the VMS sends a change power profile message 531 to the camera that the user has designated during the first step 901. Each field of the change PP message 531 is set with the values entered by the user in the GUI. There is no need to wait for an acknowledgment here since the CPU has performed the power budget calculation and power negotiation in the previous steps.

This step ends the power negotiation procedure and the CPU loops back to the initial step 901.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of managing power in a power over data network, the method comprising the following steps:
    obtaining a first request for modification of a power consumption profile of a device connected to the network,
    a power negotiation procedure comprising:
        when the modification entails a raise in the power consumption profile, determining whether the first request can be satisfied with regards to a current consumption situation over the network, and
        wherein, when it is determined that the first request cannot be satisfied:
        triggering a broadcast over the network of a second request for lowering a power consumption profile of at least one device connected to the network
        when it is determined that the first request still cannot be satisfied, ending the negotiation procedure by returning a negative acknowledgement indicating that the first request cannot be allowed.

2. The method according to claim 1, wherein when the modification entails a drop in the power consumption, or when it is determined that the first request can be satisfied, the method comprises triggering:
    the modification of the power consumption profile, and
    a broadcast of a message over the network identifying the modification of the power consumption profile.

3. The method according to claim 2, wherein the triggering of the modification of the power consumption profile comprises sending a request for modification of the power consumption profile to the device connected to the network.

4. The method according to claim 1, wherein the triggering of a broadcast over the network of a second request for lowering a power consumption profile comprises emitting a message indicating that the first request cannot be satisfied.

5. The method according to claim 1, wherein the network comprises a plurality of devices controlled by a control device, and wherein the method is carried out by each of the devices.

6. The method according to claim 1, wherein the network comprises a plurality of devices controlled by a control device, and wherein the method is carried out by the control device.

7. The method according to claim 4, wherein the network comprises a plurality of devices controlled by a control device, and wherein the message indicating that the first request cannot be satisfied is sent by a device to the control device, the broadcast over the network of a second request for lowering a power consumption profile is sent by the device and the other steps are carried out by the devices.

8. The method according to claim 1 further comprising the following steps, when a device is newly connected to the network:
- broadcasting a message comprising power profile characteristics of the device newly connected to the network,
- receiving, in response to the message, at least one power profile information message from at least one device connected to the network, the at least one power profile information message comprising power profile information concerning the at least one device connected to the network, and
- determining a current consumption situation over the network based on the received at least one power profile information message from at least one device connected to the network.

9. The method according to claim 8, further comprising:
- determining whether it is possible to lower the power profile of the device newly connected to the network with regards to the determined current consumption situation over the network, and
- if the power profile cannot be lowered, emitting an alert message indicating that at least one power consumption will not be satisfied on the network.

10. A method of managing power in a power over data network, the method comprising the following steps, performed by a monitoring device of the network:
- determining that a first request for modification of the power consumption profile of a device connected to the network cannot be satisfied, when said modification entails a raise in said power consumption profile, and
- repeatedly broadcasting over the network a second request for lowering the power consumption profiles of the other devices connected to the network.

11. The method according to claim 10, wherein the determining step comprises receiving, from the device connected to the network, a message indicating the first request for modification of its power consumption profile cannot be satisfied.

12. The method according to claim 10, further comprising transmitting to the device connected to the network, a message indicating that the first request can be satisfied.

13. The method according to claim 1, wherein the method is performed by a device connected to the network.

14. The method according to claim 13, wherein the triggering step comprises:
- transmitting to a monitoring device of the network a message indicating that the first request cannot be satisfied with regards to the current consumption situation over the network, thereby enabling the monitoring device to perform the broadcasting, and
- receiving, in response to the message, a message indicating that the first request can be satisfied.

15. The method according to claim 13, wherein the device connected to the network comprises a camera device.

16. The method according to claim 15, wherein the device connected to the network further comprises a network adapter connected to the camera device by a communication link.

17. A method according to claim 16, wherein the method further comprising:
- the camera device sending a first message to the network adapter, and
- the network adapter sending in response to the message, a second message comprising the power consumption of the network adapter.

18. A device of managing power in a power over data network, the device comprising:
- means for obtaining a first request for modification of a power consumption profile of the device, the device being connected to the network,
- means for determining whether the first request can be satisfied with regards to a current consumption situation over the network, when the modification entails a raise in the power consumption profile, and
- means for triggering a broadcast over the network of a second request for lowering a power consumption profile of at least one device connected to the network when means for determining determine that the first request cannot be satisfied.

19. A device for managing power in a power over data network, the device further comprising:
- means for determining that a first request for modification of the power consumption profile of a device connected to the network cannot be satisfied, when the modification entails a raise in the power consumption profile, and
- means for repeatedly broadcasting over the network a second request for lowering the power consumption profiles of the other devices connected to the network, the second request being repeatedly broadcasted until the first request can be satisfied.

20. A device performing the method for managing power according to claim 1; wherein the device comprises a camera device and a network adapter connected to the camera device by a communication link.

21. The device according to claim 20, wherein the camera device comprises:
- means for sending a first message to the network adapter, and
- means for receiving in response to the first message, a second message comprising the power consumption of the network adapter.

22. Network adaptor connected to a camera device by a communication link, the network adaptor comprising means for sending a message to the camera device containing a new power profile when the camera device receives a request for modification of power consumption profile.

23. A non-transitory computer-readable storage medium storing instructions of a computer program for implementing a method for managing power according to claim 10.

24. A method according to claim 1, wherein the method further comprises getting back to the determination step after the broadcasting.

* * * * *